US008918279B2

(12) United States Patent
Yonezawa et al.

(10) Patent No.: US 8,918,279 B2
(45) Date of Patent: Dec. 23, 2014

(54) ROUTE SEARCH DEVICE, ROUTE SEARCH METHOD, AND COMPUTER PROGRAM

(75) Inventors: Masanori Yonezawa, Okazaki (JP); Hiroki Ishikawa, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 338 days.

(21) Appl. No.: 13/196,429

(22) Filed: Aug. 2, 2011

(65) Prior Publication Data

US 2012/0035848 A1 Feb. 9, 2012

(30) Foreign Application Priority Data

Aug. 6, 2010 (JP) ................................. 2010-177761
Aug. 6, 2010 (JP) ................................. 2010-177762

(51) Int. Cl.
*G01C 21/26* (2006.01)
*G01C 21/28* (2006.01)

(52) U.S. Cl.
USPC ........... 701/414; 701/118; 701/416; 701/465; 701/423; 340/995.19; 340/995.21; 340/995.13

(58) Field of Classification Search
USPC ......... 701/410, 425, 457, 117–119, 533, 414, 701/416, 465, 423; 340/995.21, 995.19, 340/995.13
See application file for complete search history.

(56) References Cited

U.S. PATENT DOCUMENTS

| 6,101,443 | A  | * | 8/2000 | Kato et al. | 701/414 |
|---|---|---|---|---|---|
| 6,480,783 | B1 | * | 11/2002 | Myr | 701/117 |
| 6,615,130 | B2 | * | 9/2003 | Myr | 701/117 |
| 7,047,129 | B2 | * | 5/2006 | Uotani | 701/414 |
| 7,671,764 | B2 | * | 3/2010 | Uyeki et al. | 340/995.13 |
| 7,680,594 | B2 | * | 3/2010 | Cabral et al. | 701/423 |
| 7,680,596 | B2 | * | 3/2010 | Uyeki et al. | 701/414 |
| 7,818,121 | B2 | * | 10/2010 | Uyeki et al. | 701/413 |
| 7,877,206 | B2 | * | 1/2011 | Cabral et al. | 701/414 |

(Continued)

FOREIGN PATENT DOCUMENTS

EP    1 808 838 A2    7/2007
JP    9-105236    *    4/1997

(Continued)

OTHER PUBLICATIONS

Global positioning systems data for performance evaluation of HOV and GP lanes on I-66 and I-395/I-95; Ali, A.T. ; Venigalla, M.M. Intelligent Transportation Systems Conference, 2006. ITSC '06. IEEE; Digital Object Identifier: 10.1109/ITSC.2006.1706861 Publication Year: 2006 , pp. 915-920.*

(Continued)

*Primary Examiner* — Cuong H Nguyen
(74) *Attorney, Agent, or Firm* — Oliff PLC

(57) ABSTRACT

Route search devices, methods, and programs acquire basic congestion information, the basic congestion information being congestion information for specific links. The systems, methods, and programs set a destination and search for a first travel route from a departure point to the set destination using the acquired basic congestion information. Based on the first travel route, the systems, methods, and programs determine, whether center traffic information is necessary to be acquired. Only when it is determined that the center traffic information is necessary, the systems, methods, and programs acquire the center traffic information, the center traffic information being congestion information of a link other than the specific links, and search for a second travel route from the departure point to the set destination using the acquired additional congestion information.

6 Claims, 11 Drawing Sheets

(56) References Cited

U.S. PATENT DOCUMENTS

| | | | |
|---|---|---|---|
| 8,024,110 B2* | 9/2011 | Fushiki et al. | 701/119 |
| 8,150,612 B2* | 4/2012 | Nagase et al. | 701/118 |
| 8,706,408 B2* | 4/2014 | Nagase | 701/424 |
| 2004/0024523 A1* | 2/2004 | Uotani | 701/210 |
| 2004/0044470 A1* | 3/2004 | Matsuoka et al. | 701/209 |
| 2005/0165547 A1* | 7/2005 | Uotani | 701/210 |
| 2005/0222764 A1* | 10/2005 | Uyeki et al. | 701/210 |
| 2006/0059023 A1* | 3/2006 | Mashinsky | 705/5 |
| 2006/0069501 A1* | 3/2006 | Jung et al. | 701/209 |
| 2007/0185643 A1* | 8/2007 | Yamane et al. | 701/117 |
| 2008/0004791 A1* | 1/2008 | Sera | 701/117 |
| 2008/0120024 A1* | 5/2008 | Obradovich et al. | 701/207 |
| 2008/0294331 A1* | 11/2008 | Fushiki et al. | 701/119 |
| 2010/0121571 A1* | 5/2010 | Cabral et al. | 701/209 |
| 2013/0218467 A1* | 8/2013 | Ogawa et al. | 701/533 |

FOREIGN PATENT DOCUMENTS

| | | |
|---|---|---|
| JP | A-2001-255163 | 9/2001 |
| JP | A-2002-365066 | 12/2002 |
| JP | A-2003-139556 | 5/2003 |
| JP | A-2004-126950 | 4/2004 |
| JP | A-2004-279173 | 10/2004 |
| JP | A-2005-181152 | 7/2005 |
| JP | A-2005-241519 | 9/2005 |
| JP | A-2007-285998 | 11/2007 |
| JP | A-2009-133732 | 6/2009 |

OTHER PUBLICATIONS

Design of an Intelligent Route Planning System Using an Enhanced A-search Algorithm; Wong Poh Lee ; Osman, M.A. ; Sabudin, M.; Modelling & Simulation, 2009. AMS '09. Third Asia International Conference on; Digital Object Identifier: 10.1109/AMS.2009.132 Publication Year: 2009 , pp. 40-44.*

The impact of real time information on transport network routing through intelligent agent-based simulation; Buscema, D. et al.; Science and Technology for Humanity (TIC-STH), 2009 IEEE Toronto Inter. Conf.; Digital Object Id: 10.1109/TIC-STH.2009.5444404; Publication Year: 2009 , pp. 72-77.*

StreetSmart Traffic: Discovering and Disseminating Automobile Congestion Using VANET's; Dornbush, S. ; Joshi, A. Vehicular Technology Conference, 2007. VTC2007-Spring. IEEE 65th; Digital Object Identifier: 10.1109/VETECS.2007.15 Publication Year: 2007, pp. 11-15.*

Impact of VANET-based V2X communication using IEEE 802.11p on reducing vehicles traveling time in realistic large scale urban area; Noori, H. ; Valkama, M.; Connected Vehicles and Expo (ICCVE), 2013 International Conference on; DOI: 10.1109/ICCVE.2013. 6799873; Publication Year: 2013 , pp. 654-661.*

A novel defense scheme against DDOS attack in VANET; Pathre, A.; Agrawal, C. ; Jain, A.; Wireless and Optical Communications Networks (WOCN), 2013 Tenth International Conference on; DOI: 10.1109/WOCN.2013.6616194 Publication Year: 2013, pp. 1-5.*

Use both lanes: Multi-channel beaconing for message dissemination in vehicular networks; Klingler, F. ; Dressler, F. ; Jiannong Cao ; Sommer, C.; Wireless On-demand Network Systems and Services (WONS), 2013 10th Annual Conference on DOI: 10.1109/WONS. 2013.6578342; Publication Year: 2013 , pp. 162-169.*

Efficient congestion control in VANET for safety messaging; Mughal, B.M. ; Wagan, A.A. ; Hasbullah, H.; Information Technology (ITSim), 2010 International Symposium in; vol. 2; DOI: 10.1109/ITSIM.2010.5561609; Publication Year: 2010 , pp. 654-659.*

Traffic Congestion Classification for Nighttime Surveillance Videos; Hua-Tsung Chen ; Li-Wu Tsai ; Hui-Zhen Gu ; Suh-Yin Lee ; Lin, B.-S.P.; Multimedia and Expo Workshops (ICMEW), 2012 IEEE International Conference on; DOI: 10.1109/ICMEW.2012.36 Publication Year: 2012 , pp. 169-174.*

A Personalised Online Travel Time Prediction Model; Zhenchen Wang ; Poslad, S.; Systems, Man, and Cybernetics (SMC), 2013 IEEE International Conference on; DOI: 10.1109/SMC.2013.567; Publication Year: 2013 , pp. 3327-3332.*

Performance Evaluation of Beacon Congestion Control Algorithms for VANETs ; Long Le ; Baldessari, R. ; Salvador, P. ; Festag, A. ; Wenhui Zhang; Global Telecommunications Conference (GLOBECOM 2011), 2011 IEEE; DOI: 10.1109/GLOCOM.2011. 6133897.*

Distributed Beacon Frequency Control Algorithm for VANETs (DBFC); Lv Humeng ; Ye Xuemei ; An Li ; Wang Yuan Intelligent System Design and Engineering Application (ISDEA), 2012 Second International Conference on; DOI: 10.1109/ISdea.2012.524; Publication Year: 2012 , pp. 243-246.*

Dec. 1, 2011 European Search Report issued in EP 11 17 5547.

Japanese Patent Office, Notification of Reason(s) for Refusal mailed Jan. 28, 2014 in Japanese Patent Application No. 2010-177761 w/Partial English-language Translation.

* cited by examiner

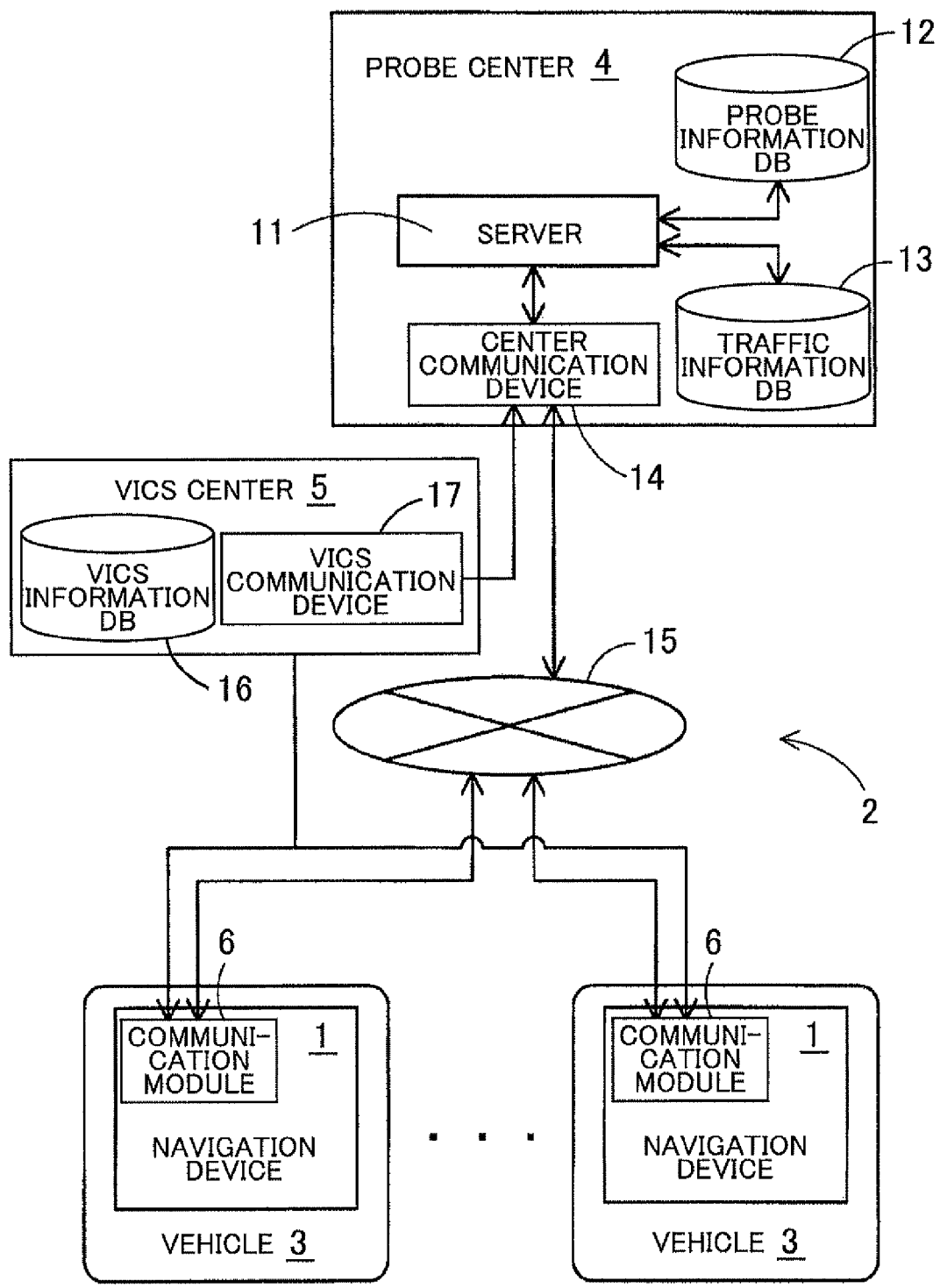

FIG. 3

CONGESTION LEVEL DETERMINATION

| CONGESTION LEVEL \ ROAD ATTRIBUTE | INTER-URBAN EXPRESSWAY | URBAN EXPRESSWAY | GENERAL ROAD |
|---|---|---|---|
| CONGESTED | LESS THAN 40km/h | LESS THAN 20km/h | LESS THAN 10km/h |
| CROWDED | 40km/h OR MORE LESS THAN 60km/h | 20km/h OR MORE LESS THAN 40km/h | 10km/h OR MORE LESS THAN 20km/h |
| UNCROWDED | 60km/h OR MORE | 40km/h OR MORE | 20km/h OR MORE |
| UNKNOWN | NOT DETERMINED DUE TO INSUFFICIENT DATA | | |

FIG. 4

CENTER TRAFFIC INFORMATION

| LINK NUMBER | CONGESTION LEVEL | LINK TRAVEL TIME (sec) | AVERAGE SPEED (km/h) |
|---|---|---|---|
| 1000 | CROWDED | 28 | 17 |
| 1001 | CONGESTED | 38 | 10 |
| 1002 | UNCROWDED | 16 | 39 |
| ... | ... | ... | ... |

FIG. 5

VICS INFORMATION
(DISTRIBUTION AT 14:01 ON AUG. 6, 2010)

| VICS LINK NUMBER | DETAIL |
|---|---|
| 533945-4-4 | CONGESTED |
| 533946-10-2 | ROAD WORK : VEHICLE REGULATED FROM 13:00 TO 18:00 |
| 533947-6-1 | CROWDED |
| ... | ... |

ROUTE SEARCH DEVICE, ROUTE SEARCH METHOD, AND COMPUTER PROGRAM

The disclosure of Japanese Patent Application No. 2010-177761, filed on Aug. 6, 2010, and No. 2010-177762, filed on Aug. 6, 2010, including the specification, drawings, and abstract thereof, is incorporated herein by reference in its entirety.

BACKGROUND

1. Related Technical Fields

Related technical fields include route search devices, methods, and computer programs that search for a route from a departure point to a set destination.

2. Related Art

Recently, many vehicles are mounted with a navigation device that enables a driver to easily arrive at his or her desired destination through travel guidance of the vehicle. Note that the navigation device here is a device that can detect a current position of the vehicle through a GPS receiver or the like, acquire map data corresponding to the current position through a storage medium such as a DVD-ROM, a HDD, or the like, or through a network, and display a map on a liquid crystal monitor. Further, the navigation device, which is provided with a route search function that, if the desired destination has been set, searches for the most appropriate route from the departure point (for example, the current position of the vehicle) to the set destination, displays a guidance route on a screen and provides voice guidance if the vehicle has approached an intersection, thereby properly guiding the driver to the desired destination. In addition, recently, some cellular phones, PDAs (Personal Digital Assistant), personal computers, and the like include the same function as the above-mentioned navigation device.

The above-mentioned navigation device and the like take into consideration the congestion of roads when searching for the most appropriate road from the departure point to the destination. Specifically, a route search is performed for example by increasing the search cost for congested roads and decreasing the search cost for uncrowded roads such that the driver can avoid the congested roads and travel along the uncrowded roads by priority.

To acquire congestion information regarding the congestion of roads, the navigation device and the like acquire the congestion information supplied from for example the vehicle information and communication system (VICS®) or acquire the congestion information as center traffic information from a center (for example, a probe center) that distributes center traffic information.

The VICS is a system in which vehicles traveling along roads are detected through sensors installed on roads, an information collecting center (hereinafter, referred to as "VICS center") collects the detected results and creates traffic information (hereinafter referred to as "VICS information"), and provides a terminal such as a car navigation device, or the like with the information. However, in the above-mentioned VICS, the VICS information can be created only for main roads where the sensors are installed. Therefore, there is a problem that the area of target roads for which the information is provided is limited.

On the other hand, in case of the probe center and the like that distribute the center traffic information, the target area for information collection is not limited like the VICS. Therefore, there is an advantage of being able to collect data from an extremely-large area in real time.

To that end, it has been conventionally proposed to utilize both the congestion information supplied from the VICS and the congestion information acquired from the probe center or the like. For example, Japanese Patent Application; Publication No. JP-A-2003-139556 proposes firstly judging based on the congestion information supplied from the VICS whether a congested section exists on the guidance route, and if it has been judged that a contested section exist on the guidance route, acquiring more detailed traffic information from the probe center.

SUMMARY

The processing for acquiring the center traffic information from the probe center or the like that distributes the center traffic information causes a problem of an increase of the processing load in the communication processing and an increase of the communication time and the communication costs because the amount of communication data transmitted and received between the center and the vehicle is large. In addition, even when the congestion information is acquired as the center traffic information from the probe center or the like and a route search is performed, the same route as when a route search is performed only based on the congestion information acquired from the VICS may be searched. In such a case, if the center traffic information is acquired from the probe center or the like as the above-mentioned Patent Document 1, the communication processing, the communication time, the communication cost, and the like may end up being meaningless.

Exemplary implementations of the broad inventive principles described herein provide a route search device, a route search method, and a computer program that are capable of decreasing the communication processing with a center, the communication time, the communication cost, and the like by previously cutting the communication with the center that will end up being meaningless, through acquiring the center traffic information from the center and performing a route search using the acquired center traffic information if it has been judged that the center traffic information is necessary to be acquired from the center.

BRIEF DESCRIPTION OF THE DRAWINGS

FIG. 2 is a block diagram showing a structure of a route search system according to the first example.

FIG. 3 shows an example of determination criteria of a congestion level.

FIG. 4 shows an example of center traffic information.

FIG. 5 shows an example of VICS information.

DETAILED DESCRIPTION OF EXAMPLES

1. First Example

Figure 1:
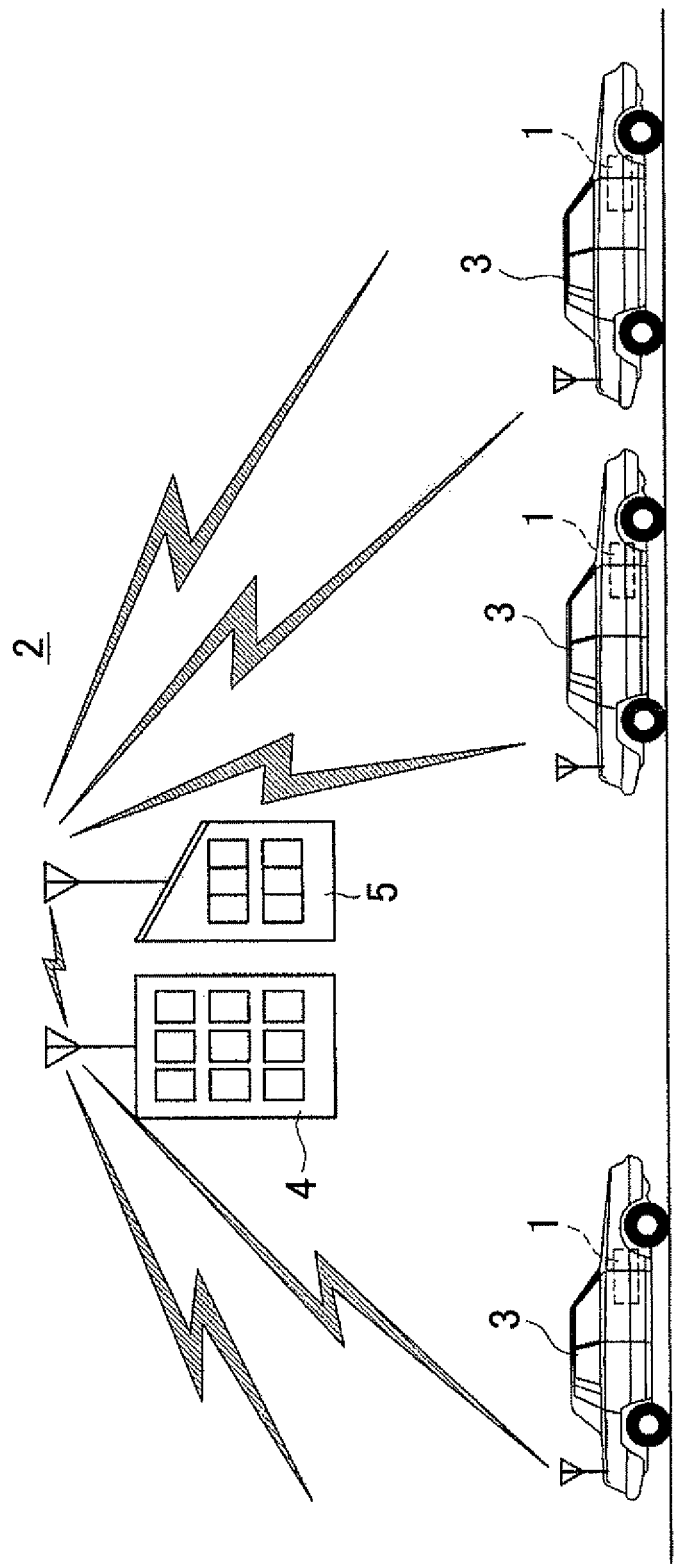
FIG. 1 is a schematic view of a route search system according to a first example.

Hereinafter, a specific example of a route search device according to a first example that is implemented in a navigation device will be explained in detail with reference to the drawings. First, a schematic structure of a route search system 2 including a navigation device 1 according to the first example will be explained with reference to FIGS. 1 and 2. FIG. 1 is a schematic view showing the route search system 2 according to the first example. FIG. 2 is a block diagram showing a structure of the route search system 2 according to the first example.

As shown in FIG. 1, the route search system 2 according to the first example basically includes vehicles 3 mounted with the navigation device 1, a probe center 4 that collects probe information from the vehicles 3 and creates and distributes traffic information based on the collected probe information, and a VICS center 5 that creates and distributes vehicle information and communication system (VICS) information.

The vehicles 3 are vehicles traveling along roads in a country and form as probe cars a probe car system together with a probe center 4 that will be described later. The probe car system here is a system that collects information using vehicles as sensors. Specifically, the vehicles transmit a current time, a current position, a vehicle speed, and operation conditions of respective systems such as a steering operation, a shift position, and the like, to the probe center 4 through a vehicular communication module 6 such as a cellular phone or the like, which was previously installed in the vehicle, and the center reuses the collected data as various kinds of information.

The probe center 4 is a traffic information distribution center that collects and accumulates the probe information including the current time, the travel information, and the like that were transmitted from the vehicles 3 traveling in the country, creates the traffic information such as congestion information from the accumulated probe information, and distributes the created traffic information to the vehicles 3 as center traffic information. In addition, the probe center 4 acquires VICS information from the VICS center 5 through an exclusive line and, if necessary, distributes to the vehicles 3 the acquired VICS information as the center traffic information together with the traffic information that was created based on the probe information.

In the route search system 2 according to the first example, the probe information that the vehicles 3 acquire and transmit to the probe center 4 includes especially information relating to link numbers of links the vehicles 3 are traveling along and the vehicle speed of the vehicles traveling along such link. The probe center 4 calculates an average vehicle speed of the vehicles for each link based on the link numbers and the vehicle speeds transmitted from the vehicles 3, and detects a congestion level of each link based on threshold values (for example, 10 km and 20 km in case of a general road) as described later. Thereafter, the probe center 4 distributes to the vehicles 3 the detected congestion level of each link as the center traffic information.

On the other hand, the VICS center 5 is an information serving center that collects detected results of the vehicles 3 traveling on the roads detected through the sensors installed on roads and information provided from specific organizations (for example, the police), creates the VICS information as the traffic information based on the detected results and the provided information, and provides the vehicles 3 with the created VICS information through FM multiplex broadcasting, optical beacons, radiowave beacons, or the like. In addition, the VICS information is also provided to the probe center 4 through the exclusive line. The provided VICS information includes the congestion information (a congestion level and a congestion length) as well as regulation information, parking lot information, service area information, parking area information, and the like. When creating the congestion level, the VICS center 5 calculates the average vehicle speed of the vehicles for each link and detects the congestion level of each link based on the threshold values. As a detection method of the congestion level by the VICS center 5, a different method may be utilized. For example, the congestion level may be detected using the number of vehicles or the density of the vehicles traveling along the road, and the like.

The vehicles 3 are provided with the navigation device 1. The navigation device 1 is an in-vehicle device that displays a map of the vicinity of the vehicle and performs a route search and route guidance to a set destination based on stored map data. In addition, the navigation device 1 provides users with the center traffic information received from the probe center 4 and the VICS information received from the VICS center 5. Further, when performing the route search, the navigation device 1 performs the route search using the congestion information included in the center traffic information received from the probe center 4 and the VICS information received from the VICS center 5. The details of the navigation device 1 will be described later.

Next, the probe center 4 is explained in detail with reference to FIG. 2. The probe center 4 basically includes a server 11, a probe information DB 12 serving as an information recording unit that is connected with the server 11, a traffic information DB 13, and a center communication device 14, as shown in FIG. 2.

The server 11 is a control device that performs overall control of the probe center 4. The server 11 includes a CPU, a RAM, a ROM, and like. The server 11 executes congestion level arithmetic processing that detects a congestion level for each link by statistically processing the probe information collected from the vehicles 3 and traffic information distribution processing that creates various traffic information including the congestion level of the link and distributes the information to the vehicles 3.

The probe information DB 12 is a storage unit that cumulatively stores the probe information collected from the vehicles 3 traveling in the country. In the first example, the probe information DB 12 includes, as the probe information collected from the vehicles 3, the information especially relating to the link number identifying a link traveled by the vehicles 3 and the vehicle speed of the vehicles 3 traveling along the link.

The traffic information DB 13 is a storage unit that stores the traffic information created by the server 11 based on the statistical processing to the probe information stored in the probe information DB 12 and the center traffic information such as the VICS information transmitted from the VICS center 5. The center traffic information stored in the traffic information DB 13 includes the congestion level of link, a link travel time, the average vehicle speed, and the like. The congestion level is a kind of congestion information indicating a congestion degree, and includes four-graded data of, from a higher congestion level, "congested," "crowded," "uncrowded," and "unknown." The congestion level is determined based on the average vehicle speed of link and the threshold values. FIG. 3 shows an example of determination criteria of the congestion level.

As shown in FIG. 3, as the threshold values for congestion level determination, different values are set depending on road attributes (three kinds of "inter-urban expressway," "urban expressway," and "general road"). Specifically, in case of "inter-urban expressway," the threshold value between "congested" and "crowded" is 40 km/h and the threshold value between "crowded" and "uncrowded" is 60 km/h. In case of "urban expressway," the threshold value between "congested" and "crowded" is 20 km/h and the threshold value between "crowded" and "uncrowded" is 40 km/h. In case of "general road," the threshold value between "congested" and "crowded" is 10 km/h and the threshold value between "crowded" and "uncrowded" is 20 km/h. If probe data is not enough to determine the congestion level, the congestion level is determined as "unknown."

Consequently, for example, the server 11 determines the congestion level as "congested" for the link, for which it has been detected that the vehicles are traveling along a general road at the average vehicle speed of 15 km/h. As the threshold values shown in FIG. 3, different values may be set for each area (a secondary mesh unit or an administrative area unit).

Next, the center traffic information stored in the traffic information DB 13 is explained in detail with reference to FIG. 4. FIG. 4 shows an example of the center traffic information stored in the traffic information DB 13.

As shown in FIG. 4, the center traffic information includes the link number identifying a link, the congestion level, the link travel time representing an average required time of the vehicles traveling along the link, and the average vehicle speed of the vehicles traveling along the link. For example, the center traffic information shown in FIG. 4 indicates that, regarding the link of a link number "1000," the congestion level is "congested," the link travel time is "28 sec," and the average vehicle speed is "17 km/h." The traffic information DB 13 stores the above-mentioned center traffic information for the amount of links forming map data included in the navigation device 1. In addition, the center traffic information includes the VICS information acquired from the VICS center 5. For example, for the links for which the probe data is not enough to determine the congestion level, the center traffic information may be created by applying the congestion level based on the VICS information. In addition, also for the links for which the probe data is enough to determine the congestion level, the center traffic information may be created by applying the congestion level based on the VICS information by priority.

If the probe center 4 receives a command for distribution from a vehicle 3, the probe center 4 distributes the center traffic information stored in the traffic information DB 13 to the vehicle that gave the command. The center traffic information subject to the distribution is information regarding the vicinity of the departure point (or a home), the destination, and the guidance route that are currently set in the vehicle 3 subject to the distribution. However, in the first example, especially when distributing the congestion information as the center traffic information, the probe center 4 does not transmit the congestion information regarding the links determined as "uncrowded" and "unknown," but transmits only the congestion information regarding the links determined as "congested" and "crowded."

The reason why only the congestion information regarding the links of which the congestion level is determined as "congested" and "crowded" is transmitted is to reduce the communication data amount (that is, communication cost and communication time) between the vehicle 3 and the probe center 4. In addition, one of the objects of the navigation device 1 is to provide guidance for a route avoiding at least congested roads and crowded roads. Therefore, if the congestion information regarding the links of which the congestion level is determined as "congested" and "crowded" is transmitted, such object can be achieved.

The link number used in the probe data and the center traffic information is an identification number used only between the probe center 4 and the navigation devices 1 of the vehicles 3, and is different from the link number (a VICS link number) used in the VICS center 5 and the VICS information. In addition, a link segment used in the probe data and the center traffic information is different from that used in the VICS center 5 and the VICS information.

The center communication device 14 is a communication device to perform communication through the vehicles 3, the VICS center 5, and a network 15.

Next, the VICS center 5 is explained with reference to FIG. 2. The VICS center 5 is provided with a VICS information DB 16 storing the VICS information and a VICS communication device 17, as shown in FIG. 2.

The VICS information DB 16 is a storage unit storing detected results of the vehicles detected through the sensors installed on roads and the VICS information as the traffic information created based on the information provided from specific organizations (for example, the police). The VICS center 5 extracts necessary information from the VICS information stored in the VICS information DB 16 at predetermined intervals (for example, at five-minute intervals) and distributes the information to the navigation device 1 through the VICS communication device 17.

When the VICS center 5 creates the congestion information as the VICS information, the VICS center 5 calculates the average vehicle speed of the vehicles based on the detected results of the vehicles through a sensor and determines the congestion level using the average vehicle speed and the threshold values in the same manner as the probe center 4 (refer to FIG. 3). However, the VICS center 5 does not determine the congestion level as "unknown." In addition, the congestion level can be determined for each section of a road instead of for each link. Or, threshold values different from those in the probe center 4 may be set and the congestion level may be determined accordingly.

The VICS communication device 17 is a communication device that distributes the VICS information to the navigation device 1 through the FM multiplex broadcasting, the optical beacons, the radiowave beacons, or the like. The navigation device 1 receives the VICS information regarding the prefecture where the vehicle exists and the prefectures in the vicinity through the FM multiplex broadcasting. In addition, when the vehicle is traveling along an expressway where the radiowave beacons are installed, the navigation device 1 further receives the VICS information regarding the expressway in the vicinity of (for example, within 200 km from) the current position of the vehicle through the radiowave beacons. When the vehicle is traveling along a main general road where the optical beacons are installed, the navigation device 1 further receives the VICS information regarding the main general road in the vicinity of (for example, within 30 km from) the current position of the vehicle through the optical beacons. In addition, the VICS information is also distributed to the probe center 4 through an exclusive communication line. The VICS information for all areas is distributed to the probe center 4. In addition to the congestion information, the regulation information, the parking lot information, the service area information, the parking area information, and the like are distributed to the navigation device 1 and the probe center 4 as the VICS information. The congestion information is created only for main roads where sensors are installed.

Hereinafter, the VICS information stored in the VICS information DB 16 is explained in detail with reference to FIG. 5. FIG. 5 shows an example of the VICS information stored in the VICS information DB 16.

As shown in FIG. 5, the VICS information includes the VICS link number identifying a link, and detailed information for such link indicating the congestion level, a congestion length indicating the section of the congestion, accident information, road work information, and the like. For example, the VICS information shown in FIG. 5 is information that was created for 5 minutes from 13:56 to 14:01 on Aug. 6, 2010 and will be distributed at 14:01. The information indicates for the link with the VICS link number "533945-4-4" that the congestion level is "congested" in the whole section. The information indicates for the link with the VICS link number "533946-10-2" that vehicle regulation due to a road work will be put into effect from 13:00 to 18:00. Further, the information indicates for the link with the VICS link number "533947-6-1" that the congestion level is "crowded" in the whole section. If only a part of the link is congested, the VICS information also includes the information regarding a coordinate of a start point of the congestion and the information regarding a distance of the congested section from the start point.

Figure 6:
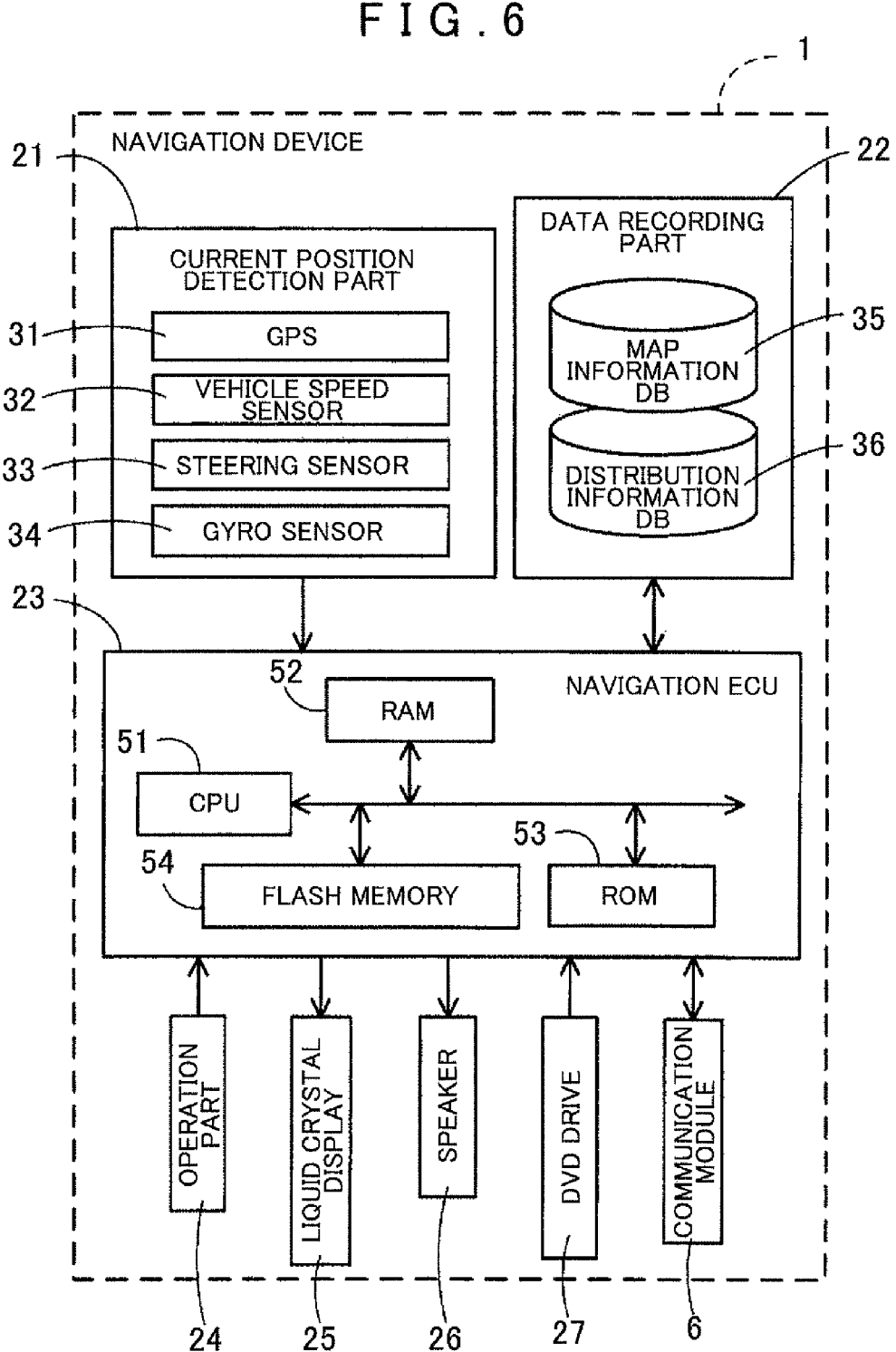
FIG. 6 is a block diagram schematically showing a control system of a navigation device according the first example.

The schematic structure of the navigation device 1 mounted in the vehicles 3 is explained with reference to FIG. 6. FIG. 6 is a block diagram schematically showing a control system of the navigation device 1 according the first example.

As shown in FIG. 6, the navigation device 1 according to the first example includes a current position detection part 21 that detects a current position of the vehicle mounted with the navigation device 1, a data recording part 22 in which various data is stored, a controller (e.g., navigation ECU 23) that performs various kinds of arithmetic processing based on the input information, an operation part 24 that receives an operation by a user, a liquid crystal display 25 that displays a map and a guidance route to a destination to the user, a speaker 26 that outputs audio guidance regarding route guidance, a DVD drive 27 that reads a DVD as a storage medium storing a program, a communication module 6 that performs communication among the probe center 4, the VICS center 5, and the like.

Hereinafter, the respective components composing the navigation device 1 are described.

The current position detecting part 21 is formed of a GPS 31, a vehicle speed sensor 32, a steering sensor 33, a gyro sensor 34, and the like, and can detect a current position and a direction of the vehicle, a traveling speed of the vehicle, a current time, and the like. Here, in particular, the vehicle speed sensor 32 is a sensor for detecting a moving distance and a speed of the vehicle, generates pulses in accordance with a rotation of drive wheels of the vehicle, and outputs pulse signals to the navigation ECU 23. Subsequently, by counting the number of generated pulses, the navigation ECU 23 calculates a rotation speed of the drive wheels and the moving distance. However, the navigation device 1 is not required to include all the aforementioned five kinds of sensors, and the navigation device 1 may include only one or a plurality of kinds of sensors among them.

The data recording part 22 is provided with a hard disk (not shown) serving as an external storage device and a recording medium, and a recording head (not shown) serving as a driver for reading a map information DB 35, a distribution information DB 36, a predetermined program, and the like, which are recorded in the hard disk, and writing predetermined data in the hard disk. The data recording part 22 may be formed of a memory card in place of the hard disk.

Here, the map information DB 35 is a storage unit storing, for example, link data regarding roads (links), node data regarding node points, facility data regarding facilities, map display data for displaying a map, intersection data regarding respective intersections, search data for searching for routes, search data for searching for points, and the like.

The search data is data used when searching for or displaying a route to the set destination. The search data includes cost data used to calculate a search cost formed of a cost when passing a node (hereinafter, referred to as "node cost") and a cost of a link forming a road (hereinafter, referred to as "link cost"), route display data to display a route selected by a route search on the map of the liquid crystal display 25, and the like.

The node cost here is basically set to a node corresponding to an intersection. The value is determined depending on for example presence or absence of a traffic signal and a travel route of the vehicle when passing the intersection (that is, straight forward, a right turn, and a left turn).

The value of the link cost is determined based on a link length. In addition, the link cost increases or decreases according to a road attribute, a road width, the number of lanes, and the congestion level.

The distribution information DB 36 is a storage unit that stores the center traffic information (FIG. 4) distributed from the probe center 4 and the VICS information (FIG. 5) distributed from the VICS center 5. The navigation ECU 23 performs route search processing using the center traffic information and the VICS information stored in the distribution information DB 36.

Figure 7:
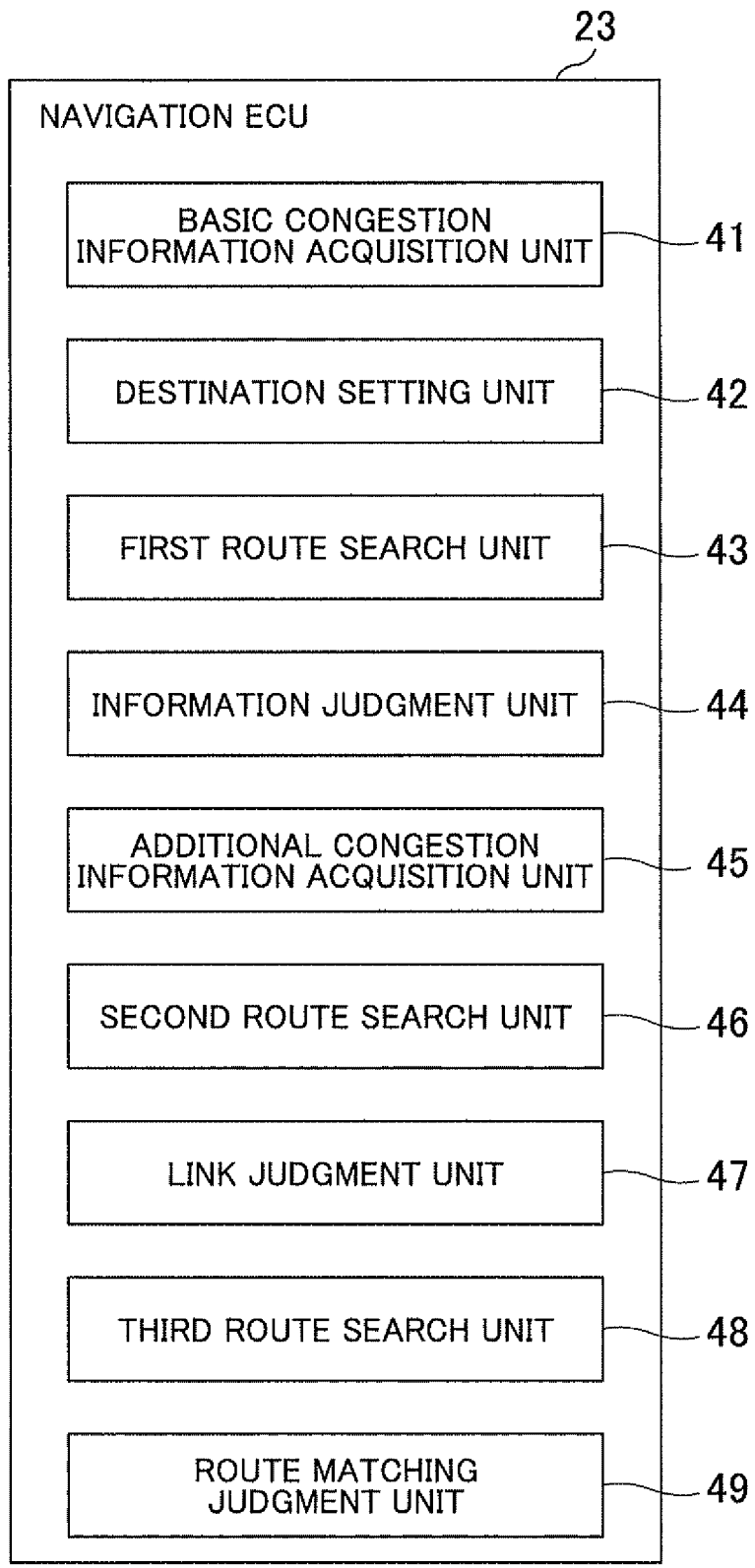
FIG. 7 shows a configuration of a navigation ECU according to the first example.

On the other hand, the navigation ECU (electronic control unit) 23, as shown in FIG. 7, serves as: a basic congestion information acquisition unit 41 that acquires basic congestion information without the probe center 4, the basic congestion information being congestion information of a specific link; a destination setting unit 42 that sets a destination; a first route search unit 43 that searches for a route from the departure point to the destination using the basic congestion information and determines a first travel route based on the searched result; an information judgment unit 44 that judges based on the first travel route whether the center traffic information is necessary to be acquired from the probe center 4; an additional congestion information acquisition unit 45 that, if it has been judged that the center traffic information is necessary to be acquired from the probe center 4, acquires additional congestion information as the center traffic information from the probe center 4, the additional congestion information being congestion information of a link other than the specific link; a second route search unit 46 that searches for a route from the departure point to the destination using the acquired additional congestion information; a link judgment unit 47 that judges whether the first travel route includes a link other than the specific link; a third route search unit 48, if the link judgment unit has judged that the first travel route includes the link other than the specific link, searches for a route from the departure point to the destination under the assumption that the link other than the specific link is congested and determines a third travel route based on the searched result; and a route matching judgment unit 49 that judges whether the first travel route matches with the third travel route. The navigation ECU 23 is an electric control unit that performs overall control of the navigation device 1. The navigation ECU 23 is provided with: a CPU 51 serving as a computing device and a control device; internal storage devices such as a RAM 52 used as a working memory when the CPU 51 executes various computing processing and in which route data or the like when the route has been searched is stored, a ROM 53 which records a program for control, and a route search processing program that will be mentioned later, and a flash memory 54 which records a program read from the ROM 53; and the like.

The operation part 24 is operated for inputting the departure point as a travel start point and the destination as a travel end point, and includes a plurality of operation switches (not shown) such as various keys, buttons, and the like. The navigation ECU 23 performs control so as to execute various kinds of operations corresponding to switch signals outputted by pressing the respective switches. The operation part 24 can also include a touch panel provided on the surface of the liquid crystal display 25.

In addition, on the liquid crystal display 25, the map image including a road, traffic information, operation guidance, an operation menu, key guidance, an expected travel route from the departure point to the destination, guidance information along the expected travel route, news, weather forecast, time, a mail, television programs, and the like are displayed. Further, the liquid crystal display 25 is also utilized to display the information relating to the facility searched when a facility search has been performed. In addition, based on the distributed VICS information and center traffic information, the information indicating a congested section and a regulated section of a road is also provided. For example, when providing the information on the congested section of the road, an arrow in a color corresponding to the congestion level (for example, red in case of a congested status, orange in case of a crowded status, and blue in case of an uncrowded status) is displayed along the road in the map image displayed on the liquid crystal display 25.

The speaker 26 outputs audio guidance for traveling the expected travel route based on an instruction from the navigation ECU 23, and the traffic information. In addition, the speaker 26 is also used to output the information relating to the facility searched by the facility search.

The DVD drive 27 is a drive that is capable of reading out data recorded in a recording medium such as DVD, CD, or the like. Based on the read data, update of the map information DB 35 or the like is performed.

In addition, the communication module 6 is a communication device for receiving the center traffic information and VICS information transmitted from the probe center 4, the VICS center 5, and the like. The communication module 6 corresponds to a cellular phone, a DCM, and the like, for example.

Figure 8:
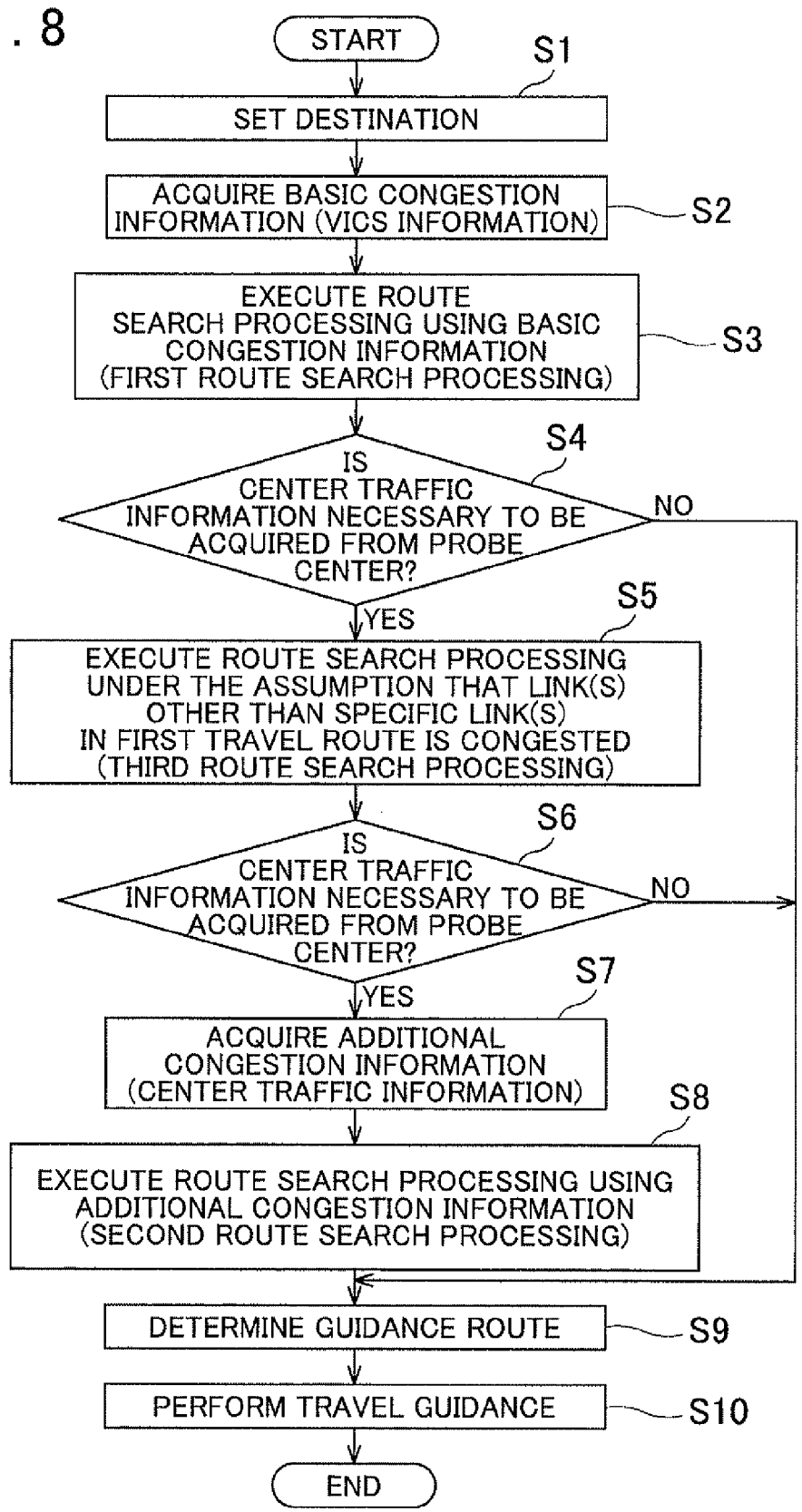
FIG. 8 is a flowchart of a route search algorithm according to the first example.

Next, an exemplary route search processing method will be described with reference to the algorithm shown in FIG. 8. The exemplary method may be implemented, for example, by one or more components of the above-described navigation device 1. For example, the exemplary method may be implemented by the CPU 51 executing a computer program stored in the ROM 53, RAM 52. However, even though the exemplary structure of the above-described navigation device 1 may be referenced in the description, it should be appreciated that the structure is exemplary and the exemplary method need not be limited by any of the above-described exemplary structure.

The route search processing method may be a program that is executed when the navigation device 1 accepts a setting operation of the destination on the operation part 24 and performs route search processing to the destination using the congestion information distributed from the probe center 4 and the VICS center 5.

First, at Step (hereinafter referred to as S) 1 of the route search processing program, the CPU 51 sets a destination based on the operation accepted on the operation part 24.

Next, at S2, the CPU 51 acquires the VICS information from the VICS center 5. At S2, the CPU 51 receives, through the FM multiplex broadcasting, the VICS information regarding only a specific area such as a prefecture where the vehicle is located, its neighboring prefectures, and the like. When the vehicle is traveling along an expressway where the radiowave beacons are installed, the CPU 51 further receives the VICS information regarding the expressway in the vicinity of (for example, within 200 km from) the current position of the vehicle through the radiowave beacons. When the vehicle is traveling along a main general road where the optical beacons are installed, the CPU 51 further receives the VICS info nation regarding the main general road in the vicinity of (for example, within 30 km from) the current position of the vehicle through the optical beacons. The VICS information acquired at S2 includes the congestion information (basic congestion information) determining the congestion degree for the main roads where the sensors are installed. Specifically, the congestion information is information that determines the congestion degree of the main roads, among, from a higher congestion level, "congested," "crowded," and "uncrowded." Consequently, the congestion information that the CPU 51 can acquire at S2 is only congestion information regarding specific links (that is, the links that are within the specific area such as a prefecture where the vehicle is located and its neighboring prefectures and where the sensors are installed).

Subsequently, at S3, the CPU 51 executes a first route search processing that searches for a route from the departure point to the destination set at S1 using the VICS information (including the basic congestion information) acquired at S2. The departure point may be the current position of the vehicle, or a designated point (for example, a home or the like). In addition, in the first route search processing at S3, a known Dijkstra method is utilized. Specifically, the route search is performed from the departure point side and the destination side, and in the overlapped area between the search from the departure point side and the search from the destination side, a value acquired by adding the search cost (the node cost and the link cost) accumulated from the departure point side and the search cost accumulated from the destination side, that is, a cost added value is calculated. Thereafter, the route of which the cost added value is the smallest is determined as the first travel route that serves as a recommended route. The link cost is multiplied by 1.5 for the link determined as "congested" based on the basic congestion information, the link cost is multiplied by 1.2 for the link determined as "crowded," and the link cost is multiplied by 0.8 for the link determined as "uncrowded." Thereby, it is possible to search for a route that avoids congested roads and guides uncrowded roads to travel by priority.

Thereafter, at S4, the CPU 51 judges whether the center traffic information is necessary to be acquired from the probe center 4. Specifically, the CPU 51 judges whether the first travel route determined at S3 includes a link(s) other than the link(s) (the specific link(s)) for which the basic congestion information was acquired at S2, that is, whether the first travel route includes a link(s) for which the congestion level cannot be determined with the basic congestion information.

Figure 9:
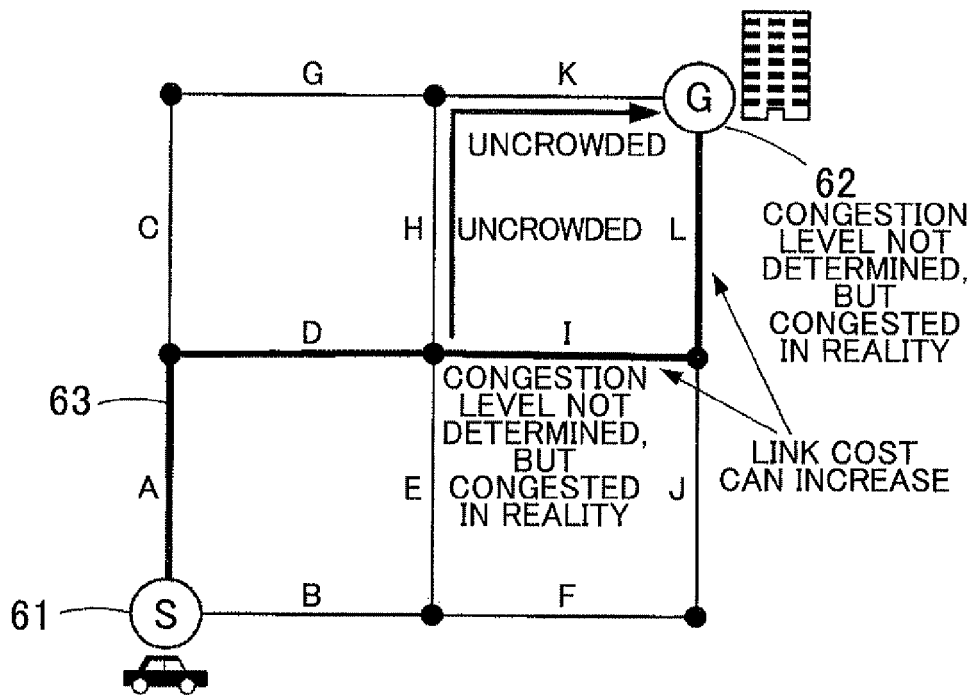
FIG. 9 shows a case where it is judged that the center traffic information is necessary to be acquired from a probe center.

If the first travel route determined at S3 includes a link(s) other than the link(s) (the specific link(s)) for which the basic congestion information was acquired at S2, it is not possible to judge whether the first travel route is a route to be really recommended because the first travel route includes a link(s) for which the congestion level cannot be determined with the basic congestion information. For example, a case is explained where a route "A⇒ D⇒ I⇒ L" was determined as the first travel route 63 from the departure point 61 to the destination 62 and the congestion levels for the link I and the link L cannot be determined with the basic congestion information while in reality the link I and the link L are congested and the link H and the link K are uncrowded, as shown in FIG. 9. In such case, if the congestion levels of the link I and the link L, for which the congestion levels were not determined with the basic congestion information, are newly acquired from the probe center 4 and a route search is performed, the information indicating that the congestion levels of the link I and the link L are "congested" is newly transmitted from the probe center 4. Therefore, if the route search processing is performed later, the link costs of the link I and the link L increase compared to the first route search processing. As a result, the recommended route is likely to be a route "A⇒ D⇒ H⇒ K" instead of the route "A⇒ D⇒ I⇒ L." Consequently, it is judged that the center traffic information is necessary to be acquired from the probe center 4.

Figure 10:
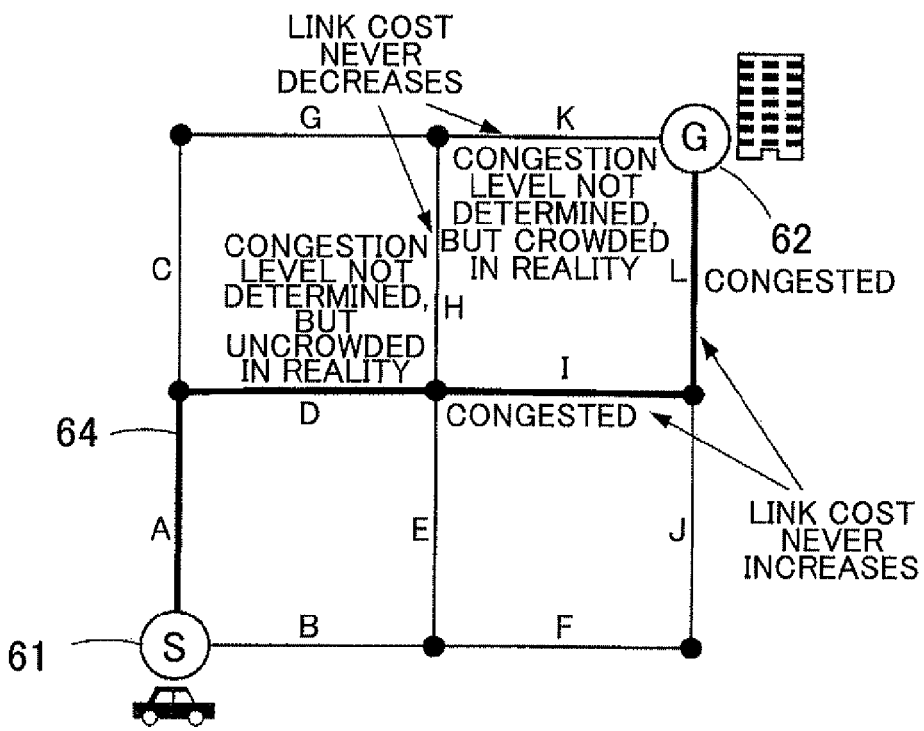
FIG. 10 shows a case where it is judged that the center traffic information is not necessary to be acquired from the probe center.

On the other hand, if the first travel route determined at S3 does not include a link(s) other than the link(s) (the specific link(s)) for which the basic congestion information was acquired at S2, a route other than the first travel route is never the recommended route even when a link other than the first travel route, the congestion level of which cannot be determined with the basic congestion information, is uncrowded. Because the congestion information to be distributed from the probe center 4 is only congestion information regarding links determined as "congested" and "crowded," and the links determined as "congested" and "crowded" are the links that increase the link costs at the route search. That is, the congestion information to be distributed from the probe center 4 is the information that increases the link cost(s) of the link(s) other than the first travel route, but not the information that increases the link cost(s) of the link(s) of the first travel route or decreases the link cost(s) of the link(s) other than the first travel route. Consequently, even if the congestion level(s) of the link(s) (the link(s) other than the specific link(s)) for which the congestion level was not determined with the basic congestion information is acquired from the probe center 4, another route will not be determined as the recommended route. For example, a case is explained where a route "A⇒ D⇒ I⇒ L" was determined as the first travel route 64 from the departure point 61 to the destination 62 and the congestion levels for the link H and the link K cannot be determined with the basic congestion information while in reality the link H is uncrowded and the link K is congested, as shown in FIG. 10. In such case, even if the congestion levels of the link H and the link K, for which the congestion levels were not determined with the basic congestion information, are newly acquired from the probe center 4, only the information indicating that the congestion level of the link K is "congested" is newly transmitted from the probe center 4. Therefore, even if the route search processing is performed later, only the link cost of the link K increases compared to the first route search processing and the link cost of the link H does not change. As a result, the recommended route will be the route "A⇒ D⇒ I⇒ L." Consequently, it is judged that the center traffic information is not necessary to be acquired from the probe center 4.

In judgment processing at S4, if it has been judged that the center traffic information is necessary to be acquired from the probe center 4, that is, it has been judged that the first travel route determined at S3 includes a link(s) other than the specific link(s) for which the basic congestion information was acquired at S2 (S4: YES), the procedure proceeds to S5.

On the other hand, if it has been judged that the center traffic information is not necessary to be acquired from the probe center 4, that is, it has been judged that the first travel route determined at S3 does not include a link(s) other than the specific link(s) for which the basic congestion information was acquired at S2 (S4: NO), the first travel route determined at S3 is determined as the guidance route (S9) and travel guidance is performed based on the determined guidance route (S10).

At S5, the CPU 51 executes, using the VICS information (including the basic congestion information) acquired at S2, third route search processing that searches for a route from the departure point to the destination set at S1 under the assumption that the link(s) other than the specific link(s) for which the basic congestion information was acquired at S2 in the first travel route is congested. Specifically, it is assumed that the congestion level of the link(s) other than specific link(s) in the first travel route is "congested" and the link cost is multiplied by 1.5. For other procedures, the third route search processing is the same as the first route search processing (S3). The route of which the cost added value is the smallest is determined as the third travel route.

Thereafter, at S6, the CPU 51 judges whether the center traffic information is necessary to be acquired from the probe center 4. Specifically, the CPU 51 judges whether the first travel route determined at S3 matches with the third travel route determined at S5.

Figure 11:
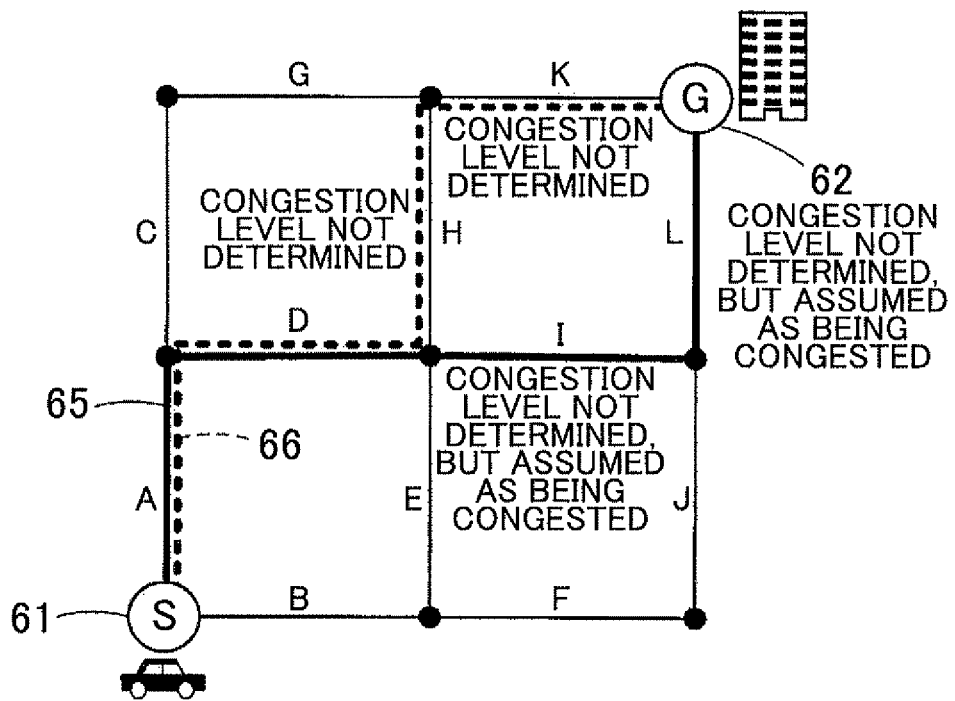
FIG. 11 shows another case where it is judged that the center traffic information is necessary to be acquired from the probe center.

The case where the first travel route does not match with the third travel route indicates a possibility that a route other than the first travel route will be the recommended route if the congestion level of the link(s) for which the congestion level was not determined with the basic congestion information in the first travel route is "congested" (that is, if it is assumed that the first travel route is in a congestion condition that should be most avoided). For example, a case is explained where the link H, the link I, the link K, and the link L are the links for which the congestion levels were not determined with the basic congestion information, the route "A⇒ D⇒ I⇒ L" is determined as the first travel route 65 from the departure point 61 to the destination 62, and the route "A⇒ D⇒ H⇒ K" is determined as the third travel route 66, as shown in FIG. 11. In such case, if the congestion levels of the link. H, the link I, the link K, and the link L, for which the congestion levels could not be determined with the basic congestion information, is newly acquired from the probe center 4, the recommended route can be the route "A⇒ D⇒ H⇒ K" that is the third travel route 66 or another route, instead of the route "A⇒ D⇒ I⇒ L" that is the first travel route 65. Consequently, it is judged that the center traffic information is necessary to be acquired from the probe center 4.

Figure 12:
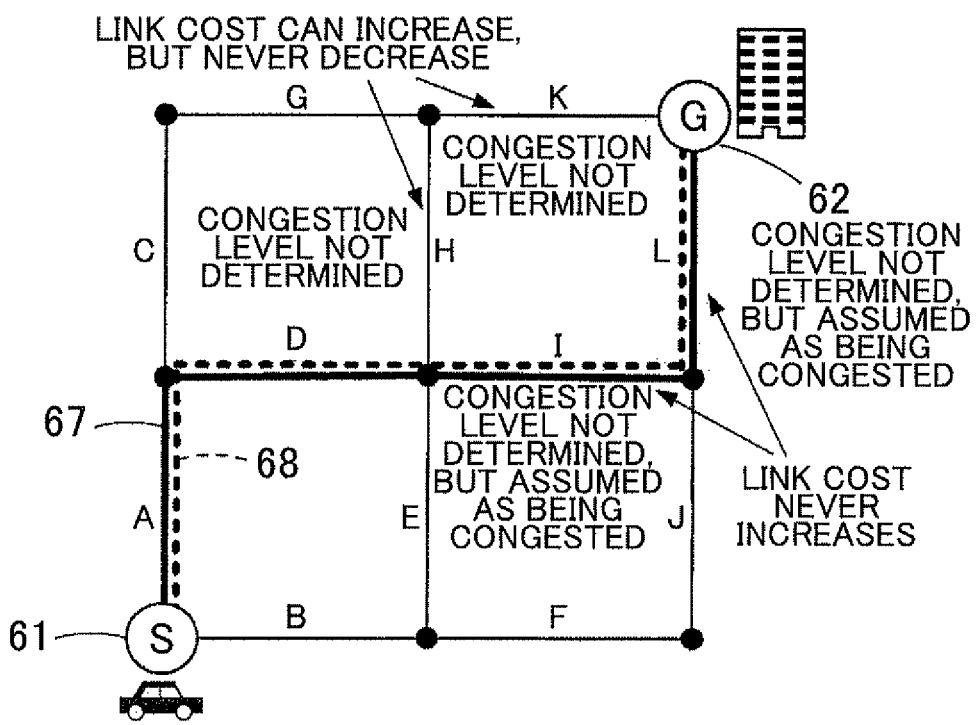
FIG. 12 shows another case where it is judged that the center traffic information is not necessary to be acquired from the probe center.

On the other hand, the case where the first travel route matches with the third travel route indicates that the first travel route will be the recommended route even if the congestion level of the link(s) for which the congestion level was not determined with the basic congestion information in the first travel route is "congested" (that is, if it is assumed that the first travel route is in a congestion condition that should be most avoided). As mentioned above, when the link costs are adjusted based on the congestion information distributed from the probe center 4, the link costs of the links of which the congestion level is "congested" are most increased, and never decreased. Consequently, if the same route becomes the recommended route when assuming that the congestion level of the link(s) for which the congestion level could not be determined with the basic congestion information in the first travel route is "congested" that most increases the link cost, the first travel route will be the recommended route even when receiving the center traffic information from the probe center 4. For example, a case is explained, where the link H, the link I, the link K, and the link L are the links for which the congestion levels were not determined with the basic congestion information, and the same route "A⇨ D⇨ I⇨ L" was determined as the first travel route 67 and the third travel route 68 from the departure point 61 to the destination 62, as shown in FIG. 12. In such case, when the congestion levels of the link H, the link I, the link K, and the link L, for which the congestion levels were not determined with the basic congestion information, are newly acquired from the probe center 4 and the route search is performed, the link costs of the link I and/or the link L may decrease, but never increase compared to the third route search processing. In addition, the link costs of the link H and/or the link K may increase, but never decrease compared to the third route search processing. As a result, the route "A⇨ D⇨ I⇨ L" that is the first travel route 67 will be the recommended route. Consequently, it is judged that the center traffic information is not necessary to be acquired from the probe center 4.

In the judgment processing, at S6, if it has been judged that the center traffic information is necessary to be acquired from the probe center 4, that is, if it has been judged that the first travel route does not match with the third travel route (S6: YES), the procedure proceeds to S7.

On the other hand, if it has been judged that the center traffic information is not necessary to be acquired from the probe center 4, that is, if it has been judged that the first travel route matches with the third travel route (S6: NO), the first travel route determined at S3 is determined as the guidance route (S9) and the travel guidance is performed based on the determined guidance route (S10).

At S7, the CPU 51 requests the center traffic information to the probe center 4 and acquires the center traffic information distributed upon request. The center traffic information target for distribution is information regarding the vicinity of the departing point, the destination, and the guidance route, which are currently set in the vehicle target for distribution. In addition, the center traffic information to be acquired at S7 includes the congestion information (the additional congestion information). However, in the first example, the center traffic information includes only the congestion information regarding the link(s) for which the congestion level is determined as "congested" or "crowded." In addition, also for the link(s) for which the congestion level was determined with the basic congestion information acquired at S2, the additional congestion information is newly acquired. In such case, the information may be overwritten (the additional congestion information is prioritized), or the information may not be overwritten (the basic congestion information is prioritized). For the link(s) for which the congestion level was determined with the basic congestion information acquired at S2, it may be configured not to receive the additional congestion information (or not to distribute the additional congestion information from the probe center 4).

Next, at S8, the CPU 51 executes the second route search processing that searches for a route from the departure point to the destination set at S1 using the VICS information (including the basic congestion information) acquired at S2 and the center traffic information (including the additional congestion information) acquired at S7. For the link(s) for which the congestion level was newly determined as "congested" with the additional congestion information, the link cost will be multiplied by 1.5, and for the link(s) for which the congestion level was determined as "crowded," the link cost will be multiplied by 1.2. For other procedures, the second route search processing is the same as the first route search processing (S3). The route of which the cost added value is the smallest is determined as the second travel route.

Subsequently, at S9, the CPU 51 determines the second travel route determined at S8 as the guidance route.

Thereafter, at S10, the CPU 51 performs travel guidance based on the guidance route determined at S9.

As explained in detail above, in the navigation device 1 according to the first example, the route search method by the navigation device 1, and the computer program that is executed in the navigation device 1; the basic congestion information is acquired from the VICS center 5 (S2); the first route search processing that searches for a route to the destination is performed based on the acquired basic congestion information (S3); it is judged whether the center traffic information is necessary to be acquired from the probe center 4 based on the first travel route determined by the first route search processing (S4 to S6); if it has been judged that the center traffic information is not necessary to be acquired, the first travel route is determined as the guidance route (S9); and if it has been judged that the center traffic information is necessary to be acquired, the additional congestion information is acquired as the center traffic information from the probe center 4 (S7), the second route search processing that searches for a route is performed based on the acquired additional congestion information (S8), the second travel route determined by the second route search processing is determined as the guidance route (S9). Therefore, it is possible to previously cut the communication with the probe center 4 that will end up being meaningless. Consequently, it is possible to decrease the communication processing with the probe center 4, the communication time, the communication cost, and the like.

In addition, it is judged whether the first travel route includes the link(s) for which the congestion level was not determined with the basic congestion information (the link(s) other than the specific link(s)) (S4); and it is judged that the center traffic information is not necessary to be acquired if it has been judged with the basic congestion information that the first travel route does not include the link(s) other than the specific link(s). Therefore, it is possible properly judge the case where the center traffic information is not necessary to be acquired from the probe center 4. That is, the congestion information to be acquired as the center traffic information is not the information that decreases the link cost at a route search; therefore, if the first travel route does not include the link(s) other than the specific link(s), it can be assumed that the same route will be the recommended route to the destination even if the center traffic information is acquired (that is, the first travel route will be the second travel route). Therefore, it can be properly judged that the center traffic information is not necessary to be acquired from the probe center 4. Thus, it is possible to previously cut the communication with the probe center 4 that will end up being meaningless.

Further, if it has been judged that the first travel route includes the link(s) other than the specific link(s), the third route search processing that searches for a route from the departure point to the destination under the assumption that the link(s) other than the specific link(s) is congested is performed (S5). If it has been judged that the first travel route does not match with the third travel route, it is judged that the center traffic information is necessary to be acquired from the probe center 4. Therefore, it is possible to properly judge a case where the center traffic information is necessary to be acquired from the probe center 4. That is, if the third travel route, which has been searched under the assumption that the first travel route is in a congestion condition that should be most avoided, does not match with the first travel route, it can be predicted that a different route may be the recommended route to the destination (that is, the first travel route may be different from the second travel route) as a result of the center traffic information acquired. Therefore, it is possible to properly judge that the center traffic information is necessary to be acquired from the probe center 4. Consequently, it is possible to previously cut the communication with the center that will end up being meaningless.

As the basic congestion information, the VICS information is acquired from the VICS center 5. As the additional congestion information, the center traffic information that was collected as the probe information from the probe center 4 and statistically processed is acquired. Therefore, it is possible to execute appropriate route search processing using both the congestion information supplied from the VICS and the congestion information collected as the probe information and statistically processed. Also, it is possible to decrease the communication processing with the probe center 4, the communication time, the communication cost, and the like.

2. Second Example

In order to solve the problems in the prior arts, it is an object of a second example to provide a route search device, a route search method, and a computer program that are capable of properly judging a case where a different route may be the recommended route to a destination as a result of center traffic information acquired from a center, whereby being able to previously cut communication with the center that will end up being meaningless and decrease communication processing with the center, communication time, communication cost, and the like.

In order to achieve the above-mentioned object, a route search device (1) according to the second example, includes: a basic congestion information acquisition unit (141) that acquires basic congestion information without a center (4) distributing center traffic information, the basic congestion information being congestion information of a specific link; a destination setting unit (142) that sets a destination; a first route search unit (143) that searches for a route from a departure point to the destination set by the destination setting unit using the basic congestion information acquired by the basic congestion information acquisition unit and determines a first travel route based on a searched result; a second route search unit (144) that searches for a route from the departure point to the destination set by the destination setting unit under the assumption that a link other than the specific link among links included in the first travel route is congested and a link other than the specific link among links not included in the first travel route is uncrowded, and determines a second travel route based on a searched result; a route matching judgment unit (145) that judges whether the first travel route matches with the second travel route; an additional congestion information acquisition unit (146) that, if the route matching judgment unit has judged that the first travel route does not match with the second travel route, acquires additional congestion information as the center traffic information from the center, the additional congestion information being congestion information of a link other than the specific link; and a third route search unit (147) that searches for a route from the departure point to the destination set by the destination setting unit using the additional congestion information acquired by the additional congestion information acquisition unit.

According to the route search device in the second example having the above configuration, it is possible to properly judge a case where a different route may be the recommended route to the destination (that is, the first travel route does not match with the third travel route) as a result of the center traffic information acquired from the center. Therefore, it is possible to previously cut the communication with the center that will end up being meaningless. Consequently, it is possible to decrease the communication processing with the center, the communication time, the communication cost, and the like.

In addition, in the route search device (1) according to the second example, the basic congestion information acquisition unit (141) acquires, as the basic congestion information, the congestion information supplied from a vehicle information and communication system, and the additional congestion information acquisition unit (146) acquires, as the additional congestion information, the congestion information that was collected as probe information and statistically processed.

According to the route search device in the second example having the above configuration, it is possible to execute appropriate route search processing using both the congestion information supplied from the vehicle information and communication system and the congestion information collected as the probe information and statistically processed in the center. Also, it is possible to decrease the communication processing with the center, the communication time, the communication cost, and the like.

The route search device (1) according to the second example includes: a basic congestion information acquisition unit (141) that acquires basic congestion information from outside of a vehicle, the basic congestion information being congestion information of a specific link; a storage unit that stores additional congestion information that is congestion information of a link other than the specific link; a destination setting unit (142) that sets a destination; a first route search unit (143) that searches for a route from a departure point to the destination set by the destination setting unit using the basic congestion information acquired by the basic congestion information acquisition unit and determines a first travel route based on a searched result; a second route search unit (144) that searches for a route from the departure point to the destination set by the destination setting unit under the assumption that a link other than the specific link among links included in the first travel route is congested and a link other than the specific link among links not included in the first travel route is uncrowded, and determines a second travel route based on a searched result; a route matching judgment unit (145) that judges whether the first travel route matches with the second travel route; an additional congestion information acquisition unit (146) that, if the route matching judgment unit has judged that the first travel route does not match with the second travel route, acquires the additional congestion information from the storage unit; a third route search unit (147) that searches for a route from the departure point to the destination set by the destination setting unit using the additional congestion information acquired by the additional congestion information acquisition unit.

According to the route search device in the second example having the above configuration, when the route search device independently performs a route search, it is possible to properly judge a case where a different route may be the recommended route to the destination (that is, the first travel route does not match with the third travel route) as a result of the congestion information acquired from the storage unit. Therefore, it is possible to previously cut the processing of reading out the congestion information stored in the storage unit that will end up being meaningless. Consequently, it is possible to decrease the processing load on a CPU caused by reading out the congestion information stored in the storage unit and shorten a search time.

In the route search device (1) according to the second example, the basic congestion information acquisition unit (141) acquires, as the basic congestion information, the congestion information supplied from a vehicle information and communication system, and the additional congestion information acquisition unit (146) acquires, as the additional congestion information, the congestion information that is stored in the storage unit. According to the route search device according to the second example having the above configuration, it is possible to execute appropriate route search processing using both the congestion information supplied from the vehicle information and communication system and the congestion information stored in the storage unit. Also, it is possible to decrease the processing load on the CPU caused by reading out the congestion information stored in the storage unit and shorten a search time.

A route search method according to the second example, includes the steps of: acquiring basic congestion information without a center (4) distributing center traffic information, the basic congestion information being congestion information of a specific link; setting a destination; searching for a route from a departure point to the destination set at the destination setting step using the basic congestion information acquired at the basic congestion information acquisition step and determining a first travel route based on a searched result; searching for a route from the departure point to the destination set at the destination setting step under the assumption that a link other than the specific link among links included in the first travel route is congested and a link other than the specific link among links not included in the first travel route is uncrowded, and determining a second travel route based on a searched result; judging whether the first travel route matches with the second travel route; acquiring, if it has been judged at the route matching judgment step that the first travel route does not match with the second travel route, additional congestion information as the center traffic information from the center, the additional congestion information being congestion information of a link other than the specific link; and searching for a route from the departure point to the destination set at the destination setting step using the additional congestion information acquired at the additional congestion information acquisition step.

According to the route search method in the second example having the above configuration, it is possible to properly judge a case where a different route may be the recommended route to the destination (that is, the first travel route does not match with the third travel route) as a result of the center traffic information acquired from the center. Therefore, it is possible to previously cut the communication with the center that will end up being meaningless. Consequently, it is possible to decrease the communication processing with the center, the communication time, the communication cost, and the like.

A program according to the second example causes a computer to perform the functions of: acquiring basic congestion information without a center (4) distributing center traffic information, the basic congestion information being congestion information of a specific link; setting a destination; searching for a route from a departure point to the destination set by the destination setting function using the basic congestion information acquired by the basic congestion information acquisition function and determining a first travel route based on a searched result; searching for a route from the departure point to the destination set by the destination setting function under the assumption that a link other than the specific link among links included in the first travel route is congested and a link other than the specific link among links not included in the first travel route is uncrowded, and determining a second travel route based on a searched result; judging whether the first travel route matches with the second travel route; acquiring, if the route matching judgment function has judged that the first travel route does not match with the second travel route, additional congestion information as the center traffic information from the center, the additional congestion information being congestion information of a link other than the specific link; and searching for a route from the departure point to the destination set by the destination setting function using the additional congestion information acquired by the additional congestion information acquisition function.

According to the program in the second example having the above configuration, it is possible to properly judge a case where a different route may be the recommended route to the destination (that is, the first travel route does not match with the third travel route) as a result of the center traffic information acquired from the center. Therefore, it is possible to previously cut the communication with the center that will end up being meaningless. Consequently, it is possible to decrease the communication processing with the center, the communication time, the communication cost, and the like.

Figure 13:
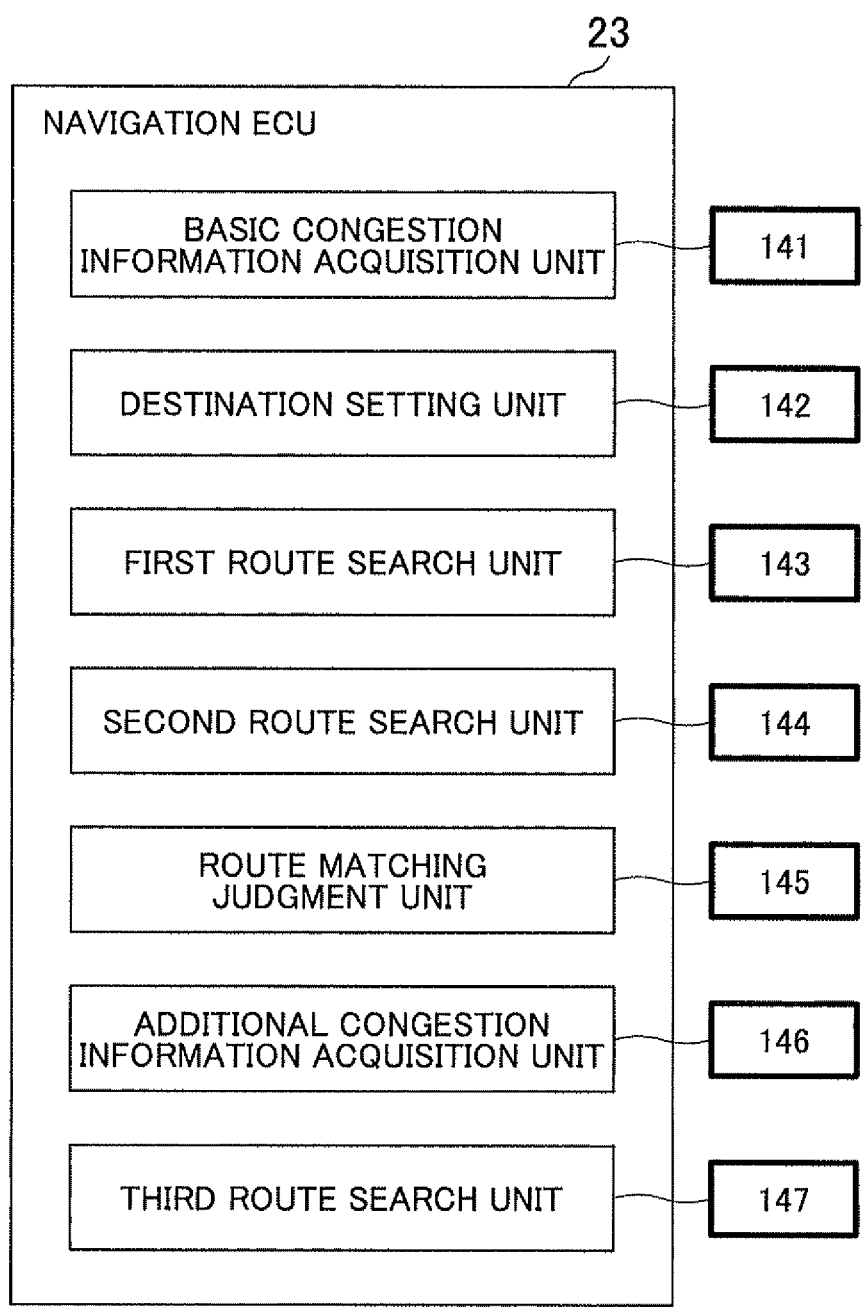
FIG. 13 shows a configuration of a navigation ECU according to a second example.

A navigation ECU according to the second example is explained with reference to FIG. 13. The second example differs only in the configuration of the navigation ECU and the processing executed in the navigation ECU from the first example. For other procedures, the second example is the same as the first example; therefore, those procedures are not explained.

The navigation ECU 23 according to the second example includes: a basic congestion information acquisition unit 141 that acquires basic congestion, information without a probe center 4 but with a VICS center 5, the basic congestion information being congestion information of a specific link; a destination setting unit 142 that sets a destination; a first route search unit 143 that searches for a route from a departure point to the destination using the basic congestion information and determines a first travel route based on a searched result; a second route search unit 144 that searches for a route from the departure point to the destination under the assumption that a link other than the specific link among links included in the first travel route is congested and a link other than the specific link among links not included in the first travel route is uncrowded, and determines a second travel route based on a searched result; a route matching judgment unit 145 that judges whether the first travel route matches with the second travel route; an additional congestion information acquisition unit 146 that, if the route matching judgment unit has judged that the first travel route does not match with the second travel route, acquires additional congestion information as the center traffic information from the probe center 4, the additional congestion information being congestion information of a link other than the specific link; and a third route search unit 147 that searches for a route from the departure point to the destination using the acquired additional congestion information. The navigation ECU 23 is an electric control unit that performs overall control of the navigation device 1. The navigation ECU 23 is provided with: a CPU 51 serving as a computing device and a control device; internal storage devices such as a RAM 52 used as a working memory when the CPU 51 executes various computing processing and in which route data or the like when the route has been searched is stored, a ROM 53 which records a program for control, and a route search processing program that will be mentioned later, and a flash memory 54 which records a program read from the ROM 53; and the like.

Figure 14:
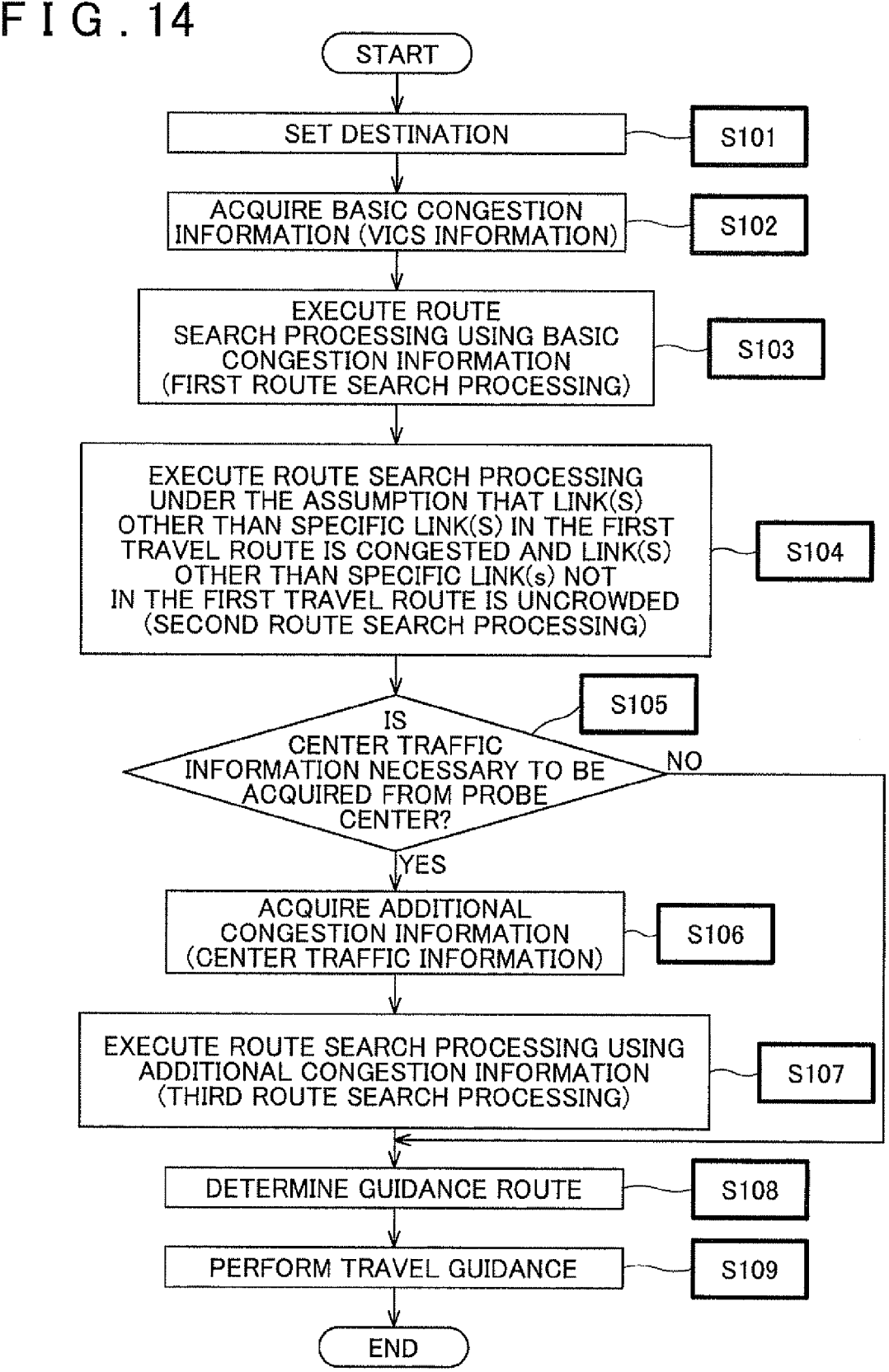
FIG. 14 is a flowchart of the route search algorithm according to the second example.

Next, an second exemplary route search processing method will be described with reference to the algorithm shown in FIG. 14. The exemplary method may be implemented, for example, by one or more components of the above-described navigation device 1. For example, the exemplary method may be implemented by the CPU 51 executing a computer program stored in the ROM 53, RAM 52. However, even though the exemplary structure of the above-described navigation device 1 may be referenced in the description, it should be appreciated that the structure is exemplary and the exemplary method need not be limited by any of the above-described exemplary structure.

The route search processing method may be a program that is executed by the navigation device 1.

First, at Step (hereinafter referred to as S) 101 of the route search processing program, the CPU 51 sets a destination based on the operation accepted on the operation part 24.

Next, at S102, the CPU 51 acquires the VICS information from the VICS center 5. At S102, the CPU 51 receives, through the FM multiplex broadcasting, the VICS information regarding only a specific area such as a prefecture where the vehicle is located, its neighboring prefectures, and the like. When the vehicle is traveling along an expressway where the radiowave beacons are installed, the CPU 51 further receives the VICS information regarding the expressway in the vicinity of (for example, within 200 km from) the current position of the vehicle through the radiowave beacons. When the vehicle is traveling along a main general road where the optical beacons are installed, the CPU 51 further receives the VICS information regarding the main general road in the vicinity of (for example, within 30 km from) the current position of the vehicle through the optical beacons. The VICS information to be acquired at S102 includes the congestion information (the basic congestion information) determining the congestion degree for the main roads where the sensors are installed. Specifically, the congestion information is information that determines the congestion degree for the main roads, among, from a higher congestion level, "congested," "crowded," and "uncrowded." Consequently, the congestion information that the CPU 51 can acquire at S102 is only congestion information regarding specific links (that is, the links that are within the specific area such as a prefecture where the vehicle is located and its neighboring prefectures and where the sensors are installed).

Subsequently, at S103, the CPU 51 executes first route search processing that searches for a route from the departure point to the destination set at S101 using the VICS infatuation (including the basic congestion information) acquired at S102. The departure point may be the current position of the vehicle, or a designated point (for example, a home or the like). In addition, in the first route search processing at S103, a known Dijkstra method is utilized. Specifically, the route search is performed from the departure point side and the destination side, and in the overlapped area between the search from the departure point side and the search from the destination side, a value acquired by adding the search cost (the node cost and the link cost) accumulated from the departure point side and the search cost accumulated from the destination side, that is, a cost added value is calculated. Thereafter, the route of which the cost added value is the smallest is determined as the first travel route that serves as the recommended route. The link cost is multiplied by 1.5 for the link determined as "congested" based on the basic congestion information, the link cost is multiplied by 1.2 for the link determined as "crowded," and the link cost is multiplied by 0.8 for the link determined as "uncrowded." Thereby, it is possible to search for a route that avoids congested roads and guides uncrowded roads to travel by priority.

Thereafter, at S104, the CPU 51 executes second route search processing that searches for a route from the departure point to the destination set at S101 using the VICS information (including the basic congestion information) acquired at S102 under the assumption that the link(s) other than the specific link(s), for which the basic congestion information was acquired at S102, among the links included in the first travel route is congested and the link(s) other than the specific link(s), for which the basic congestion information was acquired at S102, among the links not included in the first travel route is uncrowded. Specifically, the congestion level of the link(s) other than the specific link(s) among the links included in the first travel route is set as "congested" and the link cost is multiplied by 1.5. In addition, the congestion level of the link(s) other than the specific link(s) among the links not included in the first travel route is set as "uncrowded" and the link cost is multiplied by 0.8. For other procedures, the second route search processing is the same as the above-mentioned first route search processing (S103). The route of which the cost added value is the smallest is determined as the second travel route that serves as the recommended route.

Subsequently, at S105, the CPU 51 judges whether the center traffic information is necessary to be acquired from the probe center 4. Specifically, the CPU 51 judges whether the first travel route determined at S103 matches with the second travel route determined at S104.

Figure 15:
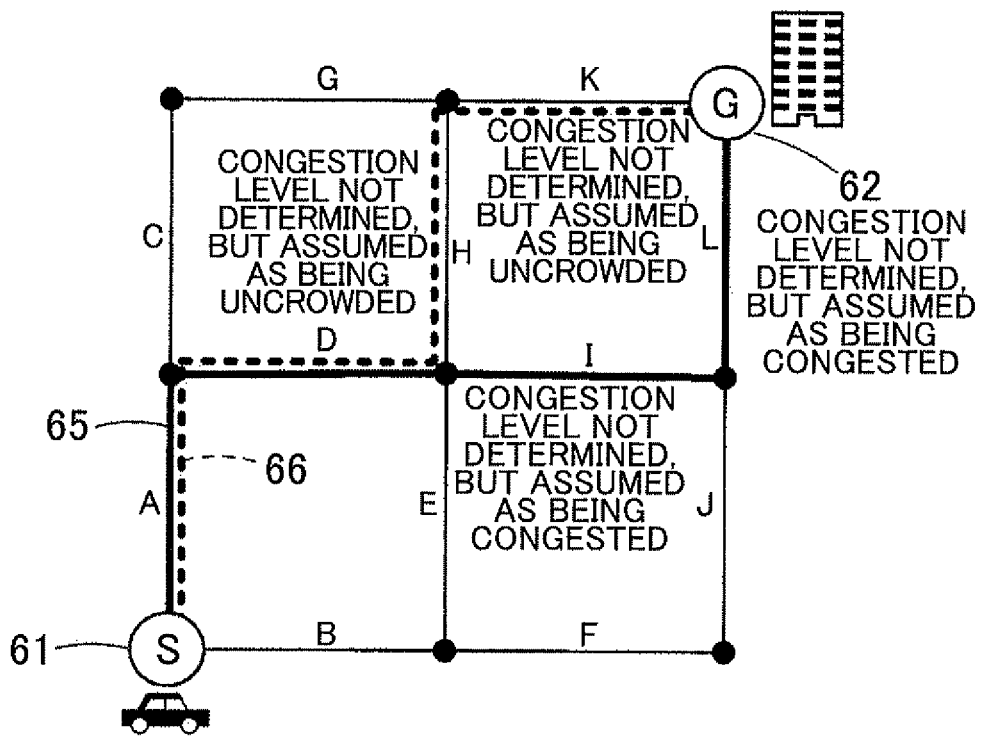
FIG. 15 shows a further case where it is judged that the center traffic information is necessary to be acquired from the probe center.

The case where the first travel route does not match with the second travel route indicates a possibility that a route other than the first travel route will be the recommended route if the congestion level of the link(s), for which the congestion level was not determined with the basic congestion information, among the links in the first travel route is "congested" and the congestion level of the link(s), for which the congestion level was not determined with the basic congestion information, among links not in the first travel route is "uncrowded" (that is, if it is assumed that the first travel route is in a congestion condition that should be most avoided). For example, a case is explained where the link H, the link I, the link K, and the link L are the links for which the congestion levels were not determined with the basic congestion information, the route "A⇒ D⇒ I⇒ L" is determined as the first travel rote 65 from the departure point 61 to the destination 62, and the route "A⇒ D⇒ H⇒ K" is determined as the second travel route 66, as shown in FIG. 15. In such case, if the congestion levels of the link H, the link I, the link K, and the link L, for which the congestion levels could not be determined with the basic congestion information, are newly acquired from the probe center 4, the recommended route can be the route "A⇒ D⇒ H⇒ K" that is the second travel route 66 or another route, instead of the route "A⇒ D⇒ I⇒ L" that is the first travel route 65. Consequently, it is judged that the center traffic information is necessary to be acquired from the probe center 4.

Figure 16:
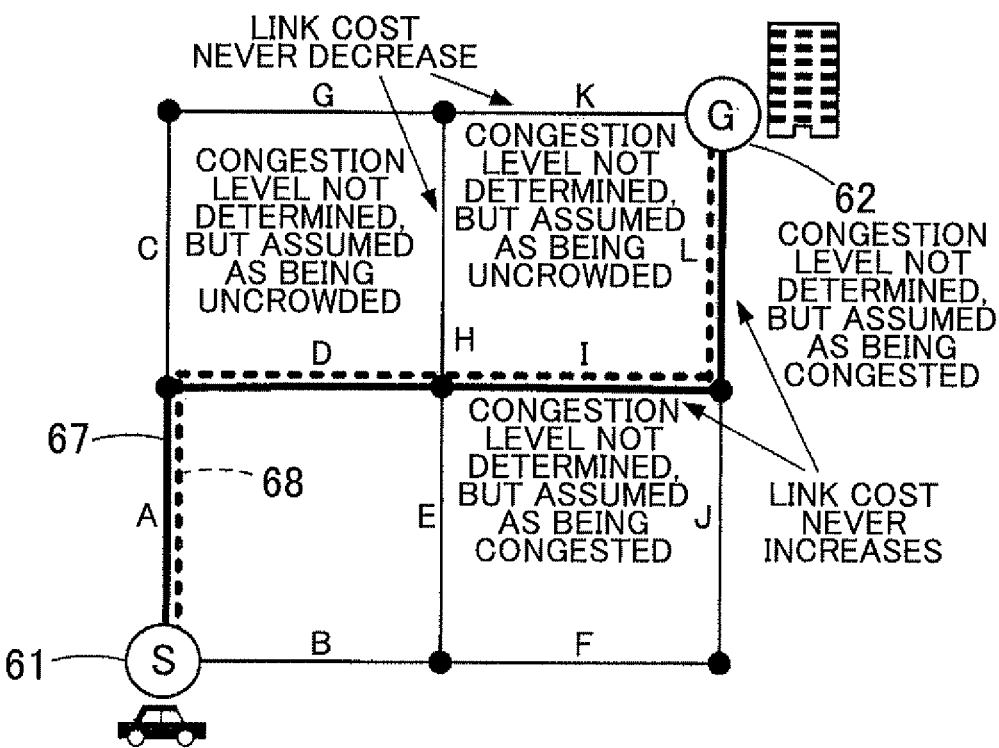
FIG. 16 shows a further case where it is judged that the center traffic information is not necessary to be acquired from the probe center.

On the other hand, the case where the first travel route matches with the second travel route indicates that the first travel route will be the recommended route even if the congestion level of the link(s), for which the congestion level was not determined with the basic congestion information, among links in the first travel route is "congested" and the congestion level of the link(s), for which the congestion level was not determined with the basic congestion information, among links not in the first travel route is "uncrowded" (that is, if it is assumed that the first travel route is in a congestion condition that should be most avoided). As mentioned above, when the link costs are adjusted based on the congestion information distributed from the probe center 4, the link costs of the links of which the congestion level is "congested" are most increased, and the link costs of the links of which the congestion level is "uncrowded" is most decreased. Consequently, if the same route becomes the recommended route when assuming that the congestion level of the link(s), for which the congestion level could not be determined, among the links in the first travel route is "congested" that most increases the link cost and the congestion level of the link(s), for which the congestion level could not be determined, among the links not in the first travel route is "uncrowded" that most decreases the link cost, the first travel route will be the recommended route even when receiving the center traffic information from the probe center 4. For example, a case is explained, where the link H, the link I, the link K, and the link L are the links for which the congestion levels were not determined with the basic congestion information, and the same route "A⇒D⇒I⇒L" was determined as the first travel route 67 and the third travel route 68 from the departure point 61 to the destination 62, as shown in FIG. 16. In such case, when the congestion levels of the link H, the link I, the link K, and the link L, for which the congestion levels were not determined with the basic congestion information, are newly acquired from the probe center 4 and the route search processing is performed, the link costs of the link I and/or the link L may decrease, but never increase compared to the second route search processing. In addition, the link costs of the link H and/or the link K may increase, but never decrease compared to the second route search processing. As a result, the route "A⇒D⇒I⇒L" that is the first travel route 67 will be the recommended route. Consequently, it is judged that the center traffic information is not necessary to be acquired from the probe center 4.

In the judgment processing at S105, if it has been judged that the center traffic information is necessary to be acquired from the probe center 4, that is, it has been judged that the first travel route does not match with the second travel route (S105: YES), the procedure proceeds to S106.

On the other hand, if it has been judged that the center traffic information is not necessary to be acquired from the probe center 4, that is, it has been judged that the first travel route matches with the second travel route (S105: NO), the first travel route determined at S103 is determined as the guidance route (S108) and travel guidance is performed based on the determined guidance route (S109).

At S106, the CPU 51 requests the center traffic information to the probe center 4 and acquires the center traffic information distributed upon request. The center traffic information target for distribution is information regarding the vicinity of the departing point, the destination, and the guidance route, which are currently set in the vehicle target for distribution. In addition, the center traffic information to be acquired at S106 includes the congestion information (the additional congestion information). In the present example, the center traffic information includes the congestion information regarding the link(s) for which the congestion level is determined as "congested," "crowded," or "uncrowded." In addition, also for the link(s) for which the congestion level is determined with the basic congestion information acquired at S102, the additional congestion information is newly acquired. In such case, the information may be overwritten (the additional congestion information is prioritized), or the information may not be overwritten (the basic congestion information is prioritized). For the link(s) for which the congestion level is determined with the basic congestion information acquired at S102, it may be configured not to receive the additional congestion information (or not to distribute the additional congestion information from the probe center 4).

Next, at S107, the CPU 51 executes the third route search processing that searches for a route from the departure point to the destination set at S101 using the VICS information (including the basic congestion information) acquired at S102 and the center traffic information (including the additional congestion information) acquired at S106. For the link(s) for which the congestion level was newly determined as "congested" with the additional congestion information, the link cost is multiplied by 1.5, for the link(s) for which the congestion level was determined as "crowded," the link cost is multiplied by 1.2, and for the link(s) for which the congestion level was determined as "uncrowded," the link cost is multiplied by 0.8. For other procedures, the third route search processing is the same as the first route search processing (S103). The route of which the cost added value is the smallest is determined as the third travel route that serves as the recommended route.

Subsequently, at S108, the CPU 51 determines the third travel route determined at S107 as the guidance route.

Thereafter, at S109, the CPU 51 performs travel guidance based on the guidance route determined at S108.

As explained in detail above, in the navigation device 1 according to the present example, the route search method by the navigation device 1, and the computer program that is executed in the navigation device 1; the basic congestion information is acquired from the VICS center 5 (S102); the first route search processing that searches for a route to the destination is performed based on the acquired basic congestion information (S103); the second route search processing that searches for a route from the departure point to the destination under the assumption that the link(s) other than the specific link(s) among the links included in the first travel route is congested and the link(s) other than the specific link(s) among the links not included in the first travel route is uncrowded (S104); if it has been judged that the first travel route does not match with the second travel route, it is judged that the center traffic information is necessary to be acquired from the probe center 4 and the additional congestion information is acquired as the center traffic information from the probe center 4 (S106); the third route search processing that searches for a route based on the acquired additional congestion information is performed (S107); and the third travel route determined by the third route search processing is determined as the guidance route (S108). Therefore, it is possible to properly judge a case where the center traffic information is necessary to be acquired from the probe center 4. That is, if the second travel route, which has been searched under the assumption that the first travel route is in a congestion condition that should be most avoided, does not match with the first travel route, it can be predicted that a different route may be the recommended route to the destination (that is, the first travel route may be different from the third travel route) as a result of the center traffic information acquired. Therefore, it is possible to properly judge that the center traffic information is necessary to be acquired from the probe center 4. Consequently, it is possible to previously cut the communication with the probe center 4 that will end up being meaningless.

Also, it is possible to decrease the communication processing with the probe center 4, the communication time, the communication cost, and the like.

As the basic congestion information, the VICS information is acquired from the VICS center 5. As the additional congestion information, the center traffic information that was collected as the probe information from the probe center 4 and statistically processed is acquired. Therefore, it is possible to execute appropriate route search processing using both the congestion information supplied from the VICS and the congestion information collected as the probe information and statistically processed. Also, it is possible to decrease the communication processing with the probe center 4, the communication time, the communication cost, and the like.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the first example, the congestion information to be acquired as the additional congestion information is the congestion information acquired from the probe center. However, for example, the congestion information to be acquired as the additional congestion information may be the congestion information acquired from statistic traffic information (traffic information acquired by statistically processing the probe traffic information and the VICS information that were collected in the past) that is stored in the DB of the navigation device 1. If it is configured that the statistic traffic information stored in the DB of the navigation device 1 is acquired as the additional congestion information, the route search processing program shown in FIG. 8 can be also applied, provided that the statistic traffic information is acquired (or read) from the DB of the navigation device 1 instead of the probe center 4 at S7.

As a result, when the navigation device 1 independently performs a route search without communication with the probe center 4, if it has been judged that the congestion information stored in the DB is necessary to be acquired, the congestion information included in the static traffic information is acquired from the DB and the route search is performed using the acquired congestion information. Therefore, it is possible to decrease the processing load on the CPU caused by reading out the congestion information stored in the DB and shorten a search time.

In the first example, the additional congestion information to be acquired from the probe center 4 is the information identifying only links of which the congestion level is "congested" or "crowded." However, the additional congestion information to be acquired from the probe center 4 may be the information identifying only links of which the congestion level is "congested."

In the second example, the congestion information to be acquired as the additional congestion information is the congestion information acquired from the probe center. However, for example, the congestion information to be acquired as the additional congestion information may be the congestion information acquired from the statistic traffic information (the traffic information acquired by statistically processing the probe traffic information and the VICS information that were collected in the past) that is stored in the DB of the navigation device 1. If it is configured that the statistic traffic information stored in the DB of the navigation device 1 is acquired as the additional congestion information, the route search processing program shown in FIG. 14 can be also applied, provided that the statistic traffic information is acquired (or read) from the DB of the navigation device 1 instead of the probe center 4 at S106.

As a result, when the navigation device 1 independently performs a route search without communication with the probe center 4, it is possible to properly judge a case where a different route may be the recommended route to the destination (that is, the first travel route does not match with the third travel route) as a result of the congestion information acquired from the storage unit. Therefore, it is possible to previously cut the processing of reading out the congestion information stored in the DB that will end up being meaningless. Consequently, it is possible to decrease the processing load on the CPU caused by reading out the congestion information stored in the DB and shorten a search time.

In addition, in the second example, the additional congestion information to be acquired from the probe center 4 is information identifying only links of which the congestion level is "congested," "crowded," or "uncrowded." However, the additional congestion information may be information identifying only links of which the congestion level is "congested" or "uncrowded."

For example, in the first example and the second example, the probe center that provides the traffic information based on the probe information is exemplified as the center that acquires the center traffic information. However, the center traffic information may be acquired from centers other than the probe center.

In addition, in the first example and the second example, when performing the route search in the navigation device 1, the link cost is multiplied by 1.5 for the link determined as "congested," the link cost is multiplied by 1.2 for the link determined as "crowded," and the link cost is multiplied by 0.8 for the link determined as "uncrowded," and the search cost is calculated. However, the increase rate and the decrease rate of the link cost based on the congestion level may be changed to other rates. In addition, the link cost for the link determined as "crowded" may not be changed to another rate.

In the first example and the second example, the congestion level is divided into 3 levels of "congested," "crowded" and "uncrowded." However, the congestion level may be divided into 2 levels or 4 levels.

In the first example and the second example, the additional congestion information that is distributed from the probe center 4 includes the congestion information collected as the probe information and statistically processed and the congestion information based on the VICS information transmitted from the VICS center 5 to the probe center 4. However, the additional congestion information may be information based on only the congestion information collected as the probe information and statistically processed.

In the first example and the second example, the VICS information supplied from the vehicle information and communication system (the VICS center 5) is utilized as the basic congestion information. However, another congestion information can be utilized as the basic congestion information, provided that the congestion information can be acquired without a center that supplies the additional congestion information.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A route search device, comprising:
a communication module configured to communicate with roadside radio beacons and a traffic center, the roadside radio beacons providing basic congestion information and the traffic center providing center traffic information, the basic traffic information being congestion information for specific links that correspond to roads on which the roadside radio beacons are installed, and the center traffic information being congestion information for links that correspond to roads on which the roadside radio beacons are not installed;
a memory storing a route search program; and
a CPU that, by executing the stored route search program:
acquires the basic congestion information from the communication module,
receives an input setting a destination;
searches for a first travel route from a departure point to the set destination using the acquired basic congestion information;
determines, based on the first travel route, whether the center traffic information is necessary to be acquired by:
(i) determining whether congestion information for any of the links included in the first travel route was not included in the basic congestion information;
(ii) when congestion information for each link included in the first travel route was included in the basic congestion information, determining that the center traffic information is not necessary;
(iii) when congestion information for any of the links included in the first travel route was not included in the basic congestion information, assuming that the congestion state of each link for which congestion information was not included in the basic congestion information is congested, and searching for a second travel route from the departure point to the set destination;
(iv) determining whether the first route matches the second route;
(v) when the first route matches the second route, determining that the center traffic information is not necessary; and
(vi) when the first route does not match the second route, determining that the center traffic information is necessary;
when it is determined that the center traffic information is not necessary, communicates the first travel route to a user; and
only when it is determined that the center traffic information is necessary to be acquired:
acquires the center traffic information from the communication module; and
searches for a third travel route from the departure point to the set destination using the acquired center traffic information; and
communicates the third travel route to a user.

2. A route search method, comprising:
acquiring, with a CPU and a communication module, basic congestion information, the basic congestion information being received by the communication module from one of a plurality of roadside radio beacons and including congestion information for specific links that correspond to roads on which the roadside radio beacons are installed;
receiving, with the CPU, an input setting a destination;
searching, with the CPU, for a first travel route from a departure point to the set destination using the acquired basic congestion information;
determining, with the CPU, based on the first travel route, whether center traffic information is necessary to be acquired by:
(i) determining whether congestion information for any of the links included in the first travel route was not included in the basic congestion information;
(ii) when congestion information for each link included in the first travel route was included in the basic congestion information, determining that the center traffic information is not necessary;
(iii) when congestion information for any of the links included in the first travel route was not included in the basic congestion information, assuming that the congestion state of each link for which congestion information was not included in the basic congestion information is congested, and searching for a second travel route from the departure point to the set destination;
(iv) determining whether the first route matches the second route;
(v) when the first route matches the second route, determining that the center traffic information is not necessary; and
(vi) when the first route does not match the second route, determining that the center traffic information is necessary;
when it is determined that the center traffic information is not necessary, communicating the first travel route to a user; and
only when it is determined that the center traffic information is necessary to be acquired:
acquiring, with the CPU, the center traffic information, the center traffic information being received by the communication module from a traffic center and including congestion information for links that correspond to roads on which the roadside radio beacons are not installed; and
searching, with the CPU, for a third travel route from the departure point to the set destination using the acquired center traffic information; and
communicating, with the CPU, the third travel route to a user.

3. The route search method according to claim 2, wherein:
the roadside radio beacons are part of a vehicle information and communication system; and
the center traffic information is traffic information that was collected as probe information and statistically processed.

4. The route search device according to claim 1, wherein:
the roadside radio beacons are part of a vehicle information and communication system; and
the center traffic information is traffic information that was collected as probe information and statistically processed by the traffic center.

5. The route search device of claim 1, wherein the route search device is included in a navigation device.

6. A non-transitory computer-readable storage medium storing a computer-executable route search program, the program configured to perform the following functions:
acquiring, with a communication module, basic congestion information, the basic congestion information being received by the communication module from one of a plurality of roadside radio beacons and including congestion information for specific links that correspond to roads on which the roadside radio beacons are installed;

receiving an input setting a destination;

searching for a first travel route from a departure point to the set destination using the acquired basic congestion information;

determining based on the first travel route, whether center traffic information is necessary to be acquired by:
- (i) determining whether congestion information for any of the links included in the first travel route was not included in the basic congestion information;
- (ii) when congestion information for each link included in the first travel route was included in the basic congestion information, determining that the center traffic information is not necessary;
- (iii) when congestion information for any of the links included in the first travel route was not included in the basic congestion information, assuming that the congestion state of each link for which congestion information was not included in the basic congestion information is congested, and searching for a second travel route from the departure point to the set destination;
- (iv) determining whether the first route matches the second route;
- (v) when the first route matches the second route, determining that the center traffic information is not necessary; and
- (vi) when the first route does not match the second route, determining that the center traffic information is necessary;

when it is determined that the center traffic information is not necessary, communicating the first travel route to a user; and only when it is determined that the center traffic information is necessary to be acquired:
- acquiring the center traffic information, the center traffic information being received by the communication module from a traffic center and including congestion information for links that correspond to roads on which the roadside radio beacons are not installed; and
- searching for a third travel route from the departure point to the set destination using the acquired center traffic information; and
- communicating the third travel route to a user.

* * * * *